(12) United States Patent
Takada et al.

(10) Patent No.: US 9,086,103 B2
(45) Date of Patent: Jul. 21, 2015

(54) ROTATION TRANSMISSION DEVICE

(75) Inventors: Seiichi Takada, Kuwana (JP); Tsutomu Maiwa, Kuwana (JP)

(73) Assignee: NTN Corporation, Osaka (JP)

( * ) Notice: Subject to any disclaimer, the term of this patent is extended or adjusted under 35 U.S.C. 154(b) by 769 days.

(21) Appl. No.: 13/145,372

(22) PCT Filed: Mar. 10, 2010

(86) PCT No.: PCT/JP2010/054013
§ 371 (c)(1),
(2), (4) Date: Jul. 20, 2011

(87) PCT Pub. No.: WO2010/106952
PCT Pub. Date: Sep. 23, 2010

(65) Prior Publication Data
US 2011/0271795 A1 Nov. 10, 2011

(30) Foreign Application Priority Data

Mar. 16, 2009 (JP) ................................ 2009-062520
Jul. 14, 2009 (JP) ................................ 2009-165485

(51) Int. Cl.
*F16H 3/02* (2006.01)
*F16D 47/04* (2006.01)
(Continued)

(52) U.S. Cl.
CPC .............. *F16D 47/04* (2013.01); *F16D 41/066* (2013.01); *F16H 3/003* (2013.01); *F16H 31/001* (2013.01); *Y10T 74/19172* (2015.01)

(58) Field of Classification Search
CPC .................................... F16H 3/02; F16H 3/10
USPC ..................................................... 74/88, 378
See application file for complete search history.

(56) References Cited

U.S. PATENT DOCUMENTS 832,077 A * 10/1906 Pearce ............................ 74/134
5,860,321 A * 1/1999 Williams et al. ................ 74/143
(Continued)

FOREIGN PATENT DOCUMENTS

JP 57-100649 6/1982
JP 6-4455 * 1/1994 ............. F16H 35/00
(Continued)

OTHER PUBLICATIONS

English translation of the Written Opinion of the International Searching Authority issued Jun. 8, 2010 in PCT/JP2010/054013.
(Continued)

*Primary Examiner* — William Kelleher
*Assistant Examiner* — Terence Boes
(74) *Attorney, Agent, or Firm* — Wenderoth, Lind & Ponack, L.L.P.

(57) ABSTRACT

A rotation transmission device includes coaxial input and output shafts (1 and 2), a pair of opposed bevel gears (3 and 4) rotatably mounted around the input shaft (1), and an intermediate bevel gear (5) meshing with the opposed bevel gears (3 and 4). The output shaft (2) and one of the opposed bevel gears (3) are rotationally fixed to each other. A first one-way clutch (6) is provided through which the rotation of the input shaft (1) is transmitted to the one of the opposed bevel gears (3). A second one-way clutch (7) is provided through which the rotation of the input shaft (1) in the reverse direction is transmitted to the other of the opposed bevel gears (4). Thus, the output shaft (2) can be rotated in the normal direction irrespective of whether the input shaft (1) is rotated in the normal direction or in the reverse direction.

10 Claims, 18 Drawing Sheets

(51) Int. Cl.
  *F16D 41/066* (2006.01)
  *F16H 3/00* (2006.01)
  *F16H 31/00* (2006.01)

(56) References Cited

U.S. PATENT DOCUMENTS

| | | | | |
|---|---|---|---|---|
| 5,881,609 | A | * | 3/1999 | Palmer .......................... 74/810.1 |
| 5,931,062 | A | * | 8/1999 | Marcovici .................... 81/57.31 |
| 2010/0089714 | A1 | | 4/2010 | Takada et al. |

FOREIGN PATENT DOCUMENTS

| | | |
|---|---|---|
| JP | 6-8301 | 3/1994 |
| JP | 2002-154727 | 5/2002 |
| JP | 2002-168309 | 6/2002 |
| JP | 2004-084783 | 3/2004 |
| JP | 2008-240786 | 10/2008 |
| JP | 2009-008247 | 1/2009 |

OTHER PUBLICATIONS

Japanese Notice of Reasons for Rejection, issued Jun. 25, 2013 in a Japanese application that is a foreign counterpart to the present application (with partial English translation).

International Search Report issued Jun. 8, 2010 in International (PCT) Application No. PCT/JP2010/054013.

* cited by examiner

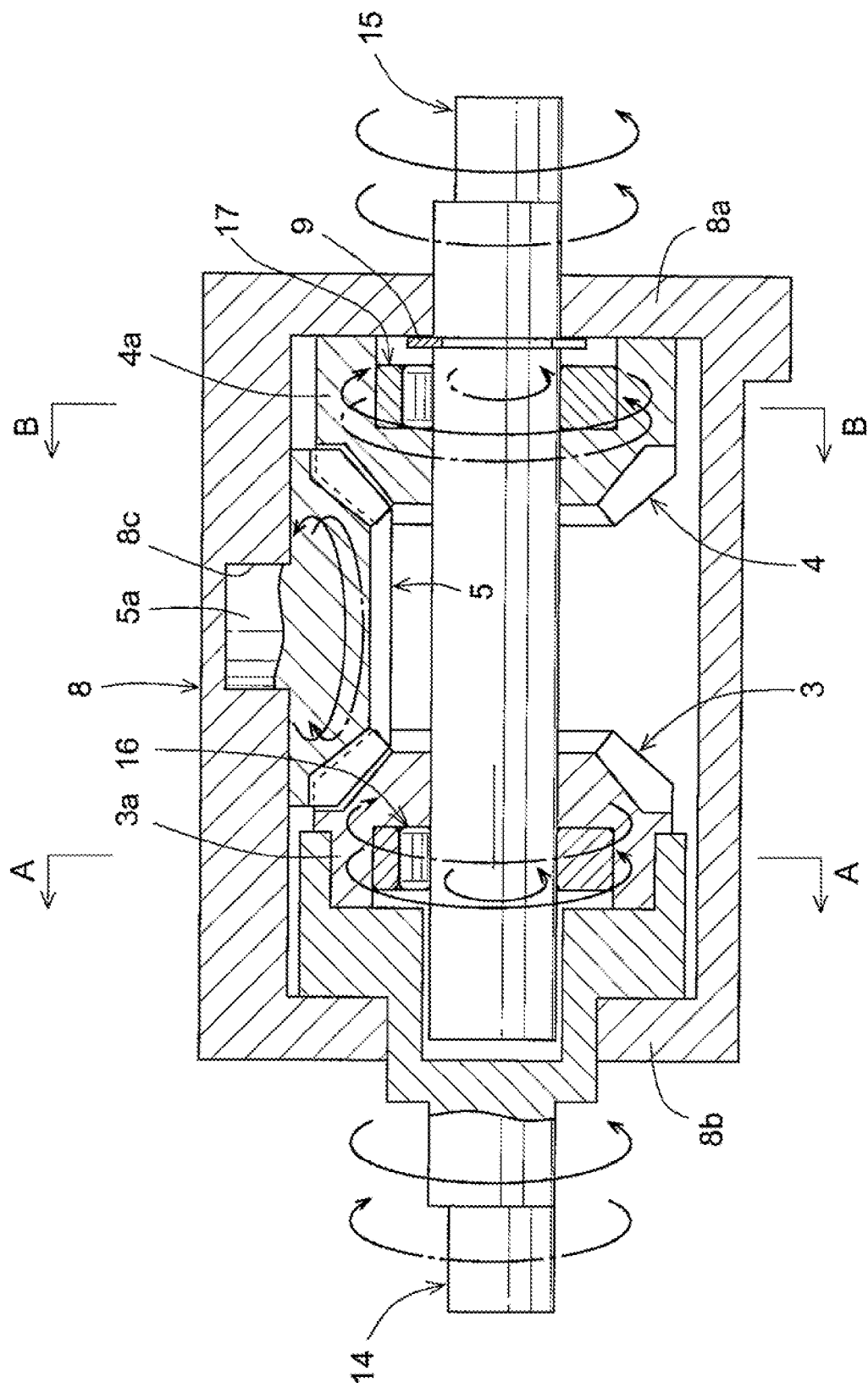

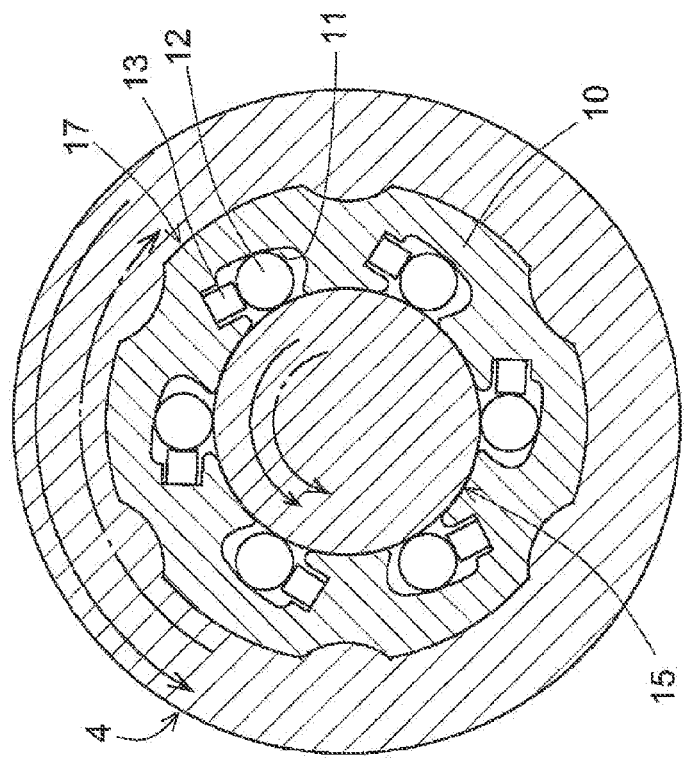
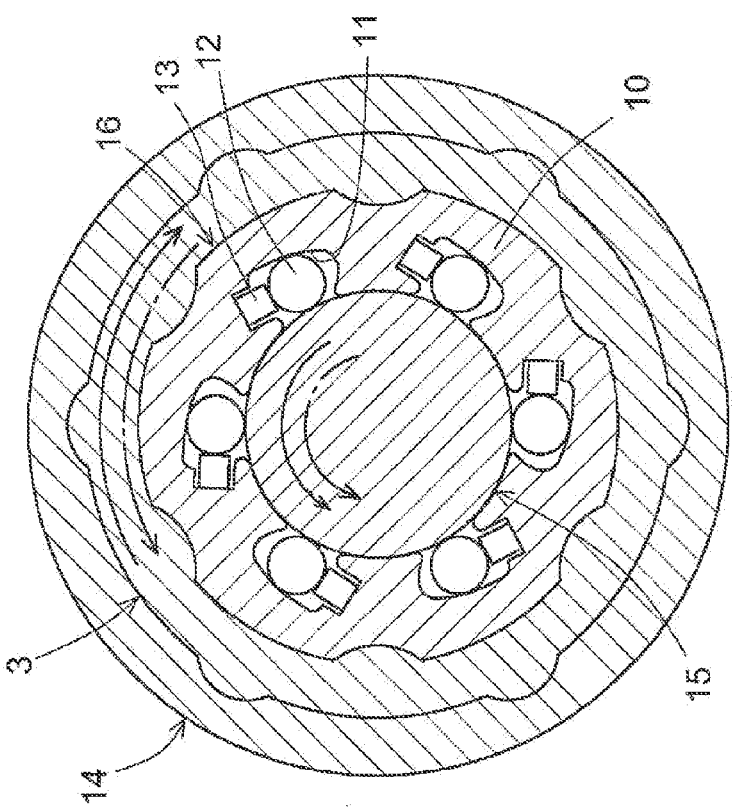

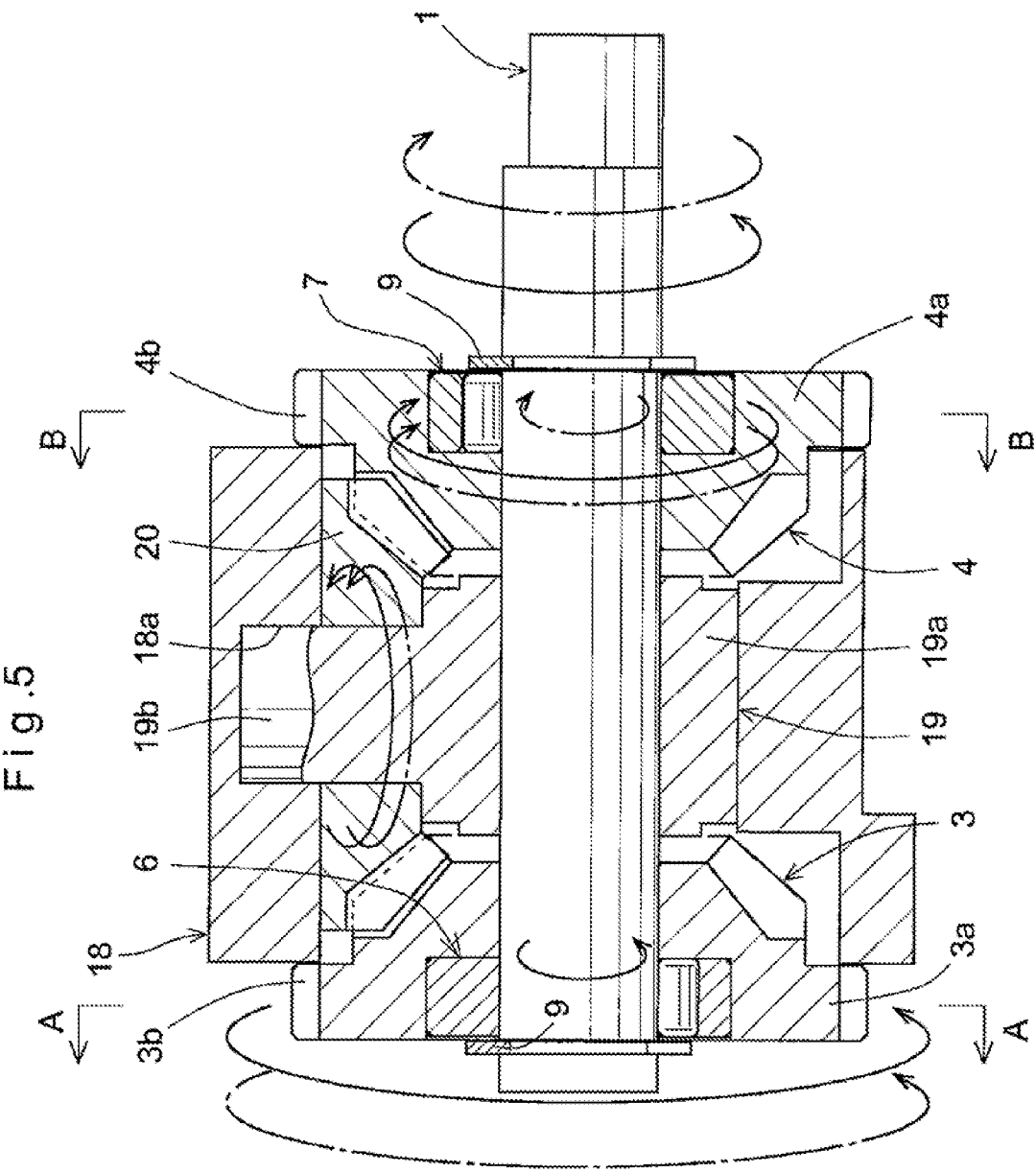

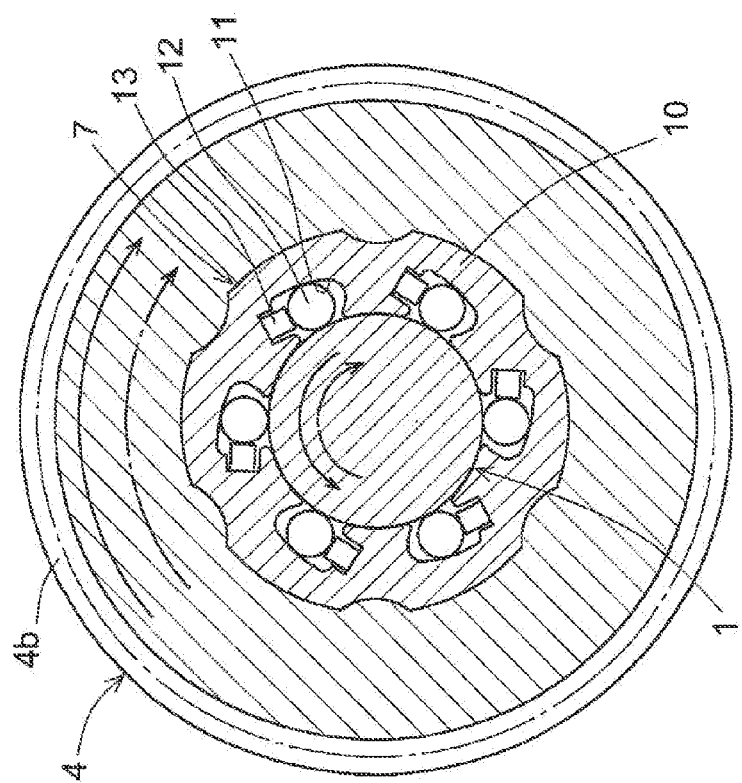
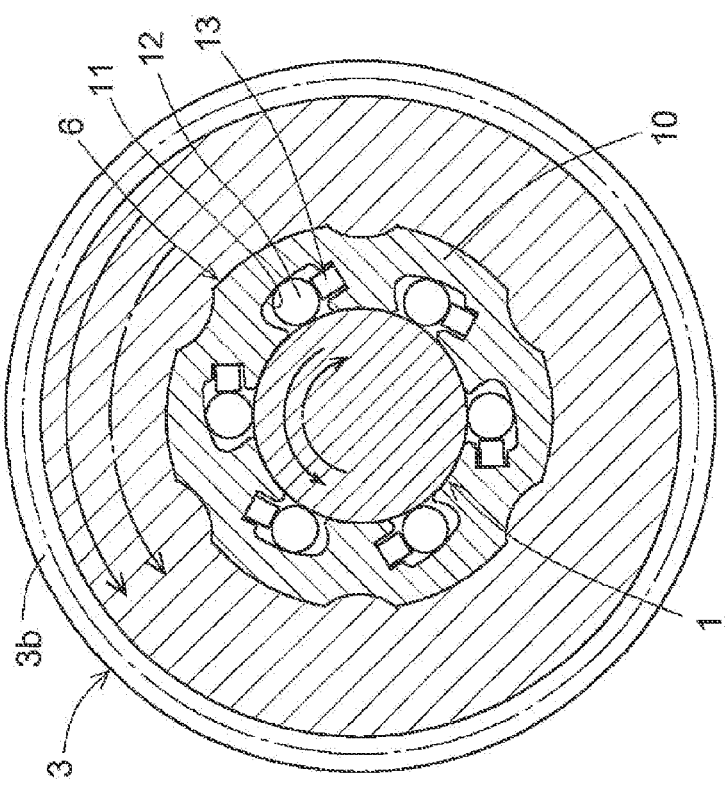

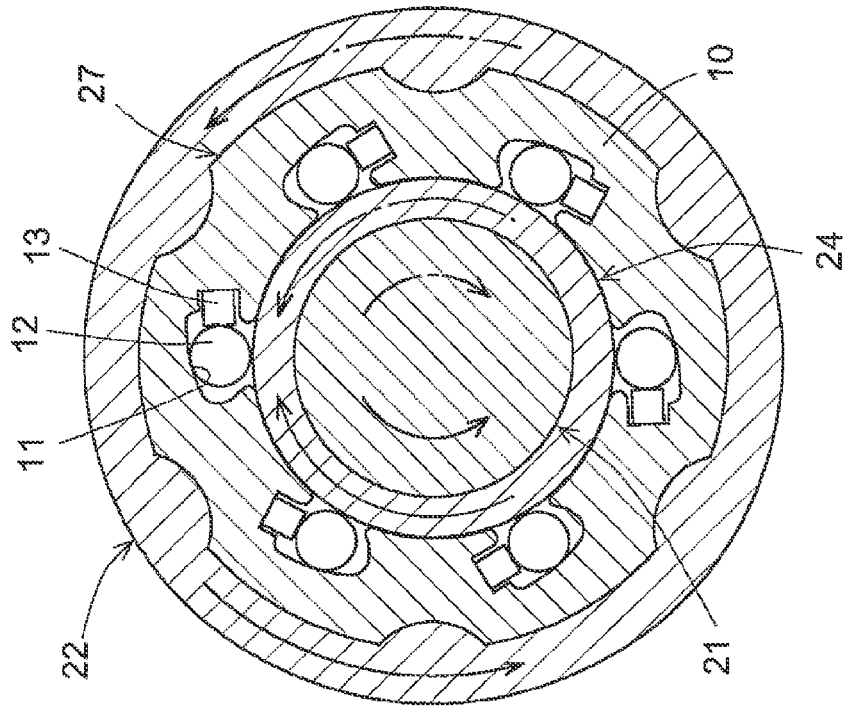
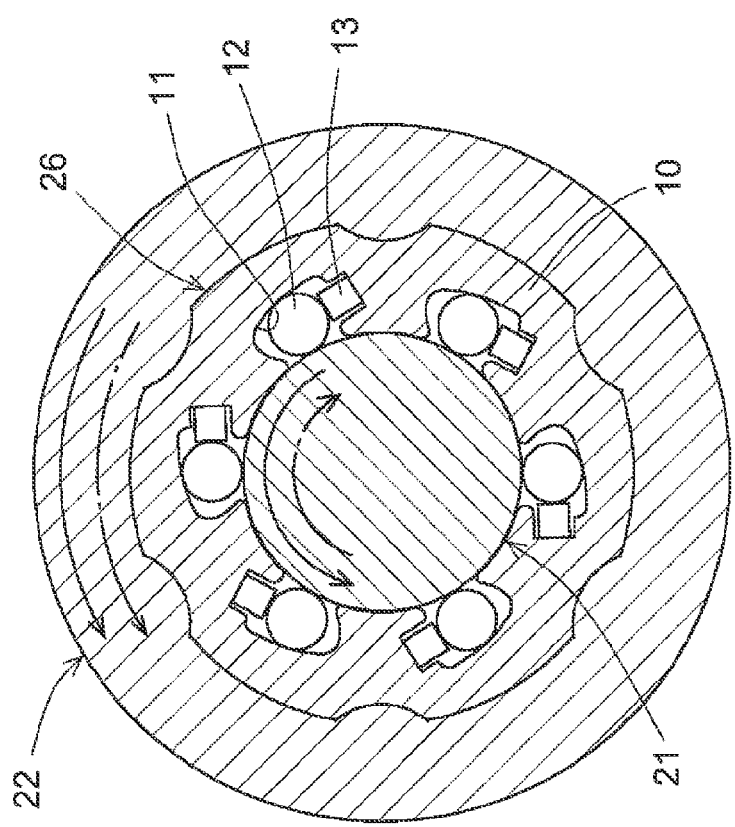

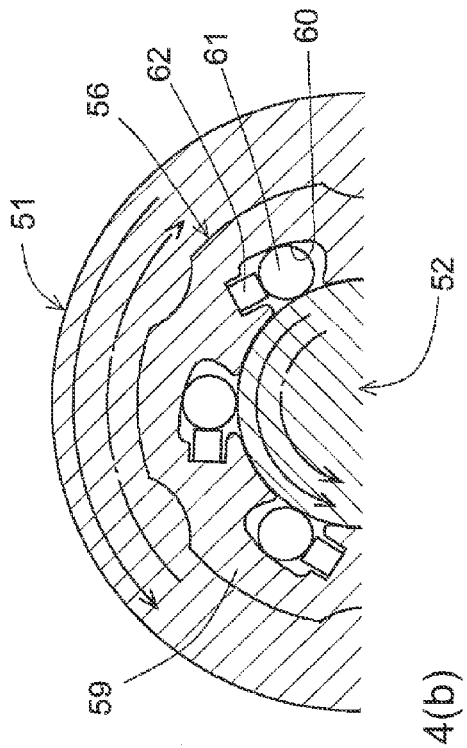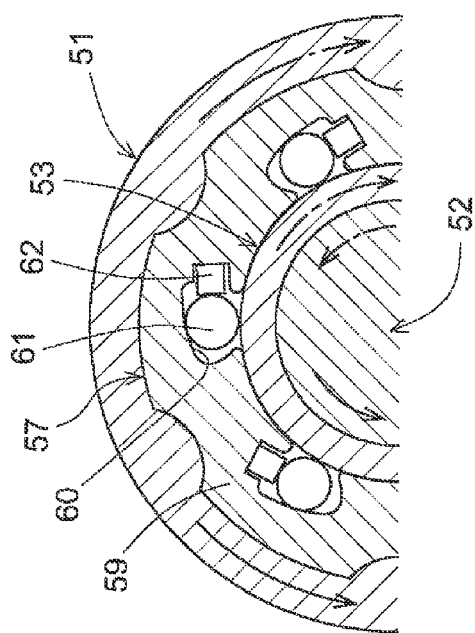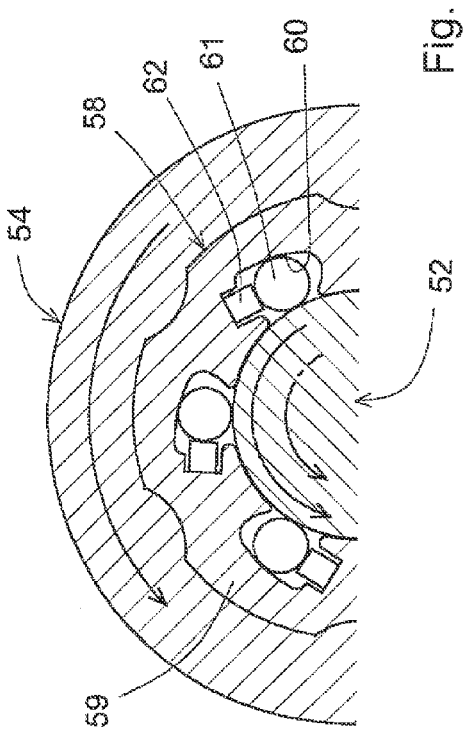

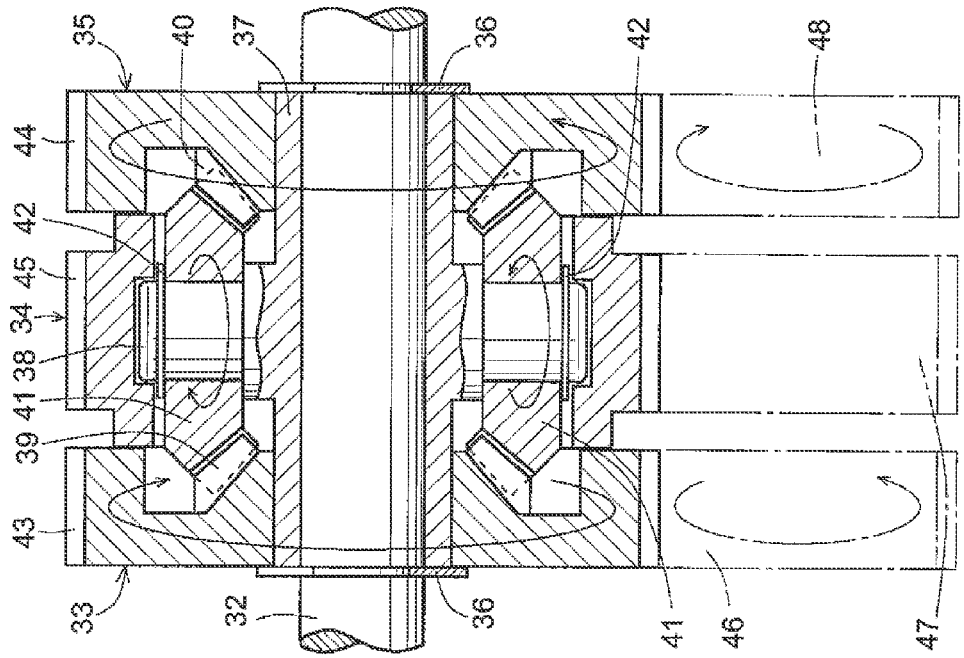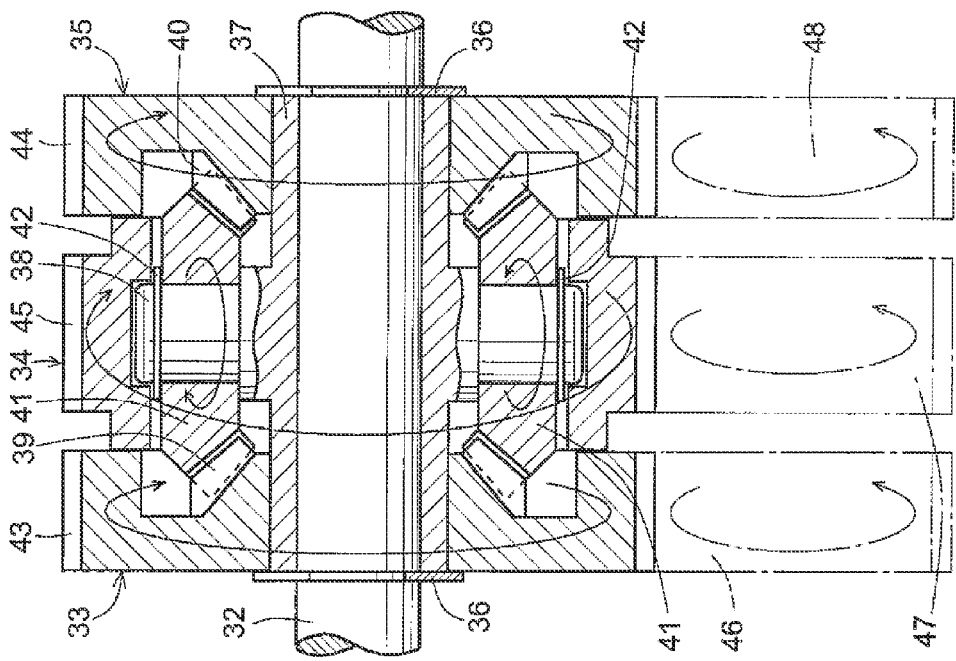

ROTATION TRANSMISSION DEVICE

TECHNICAL FIELD

The present invention relates to a rotation transmission device which can convert rotation applied to an input shaft in either direction to rotation of an output shaft in a single direction, or which can switch the rotational direction of an output member without changing the rotational direction of an input member.

BACKGROUND ART

It is required for some driving units of e.g. copying machines that the output shaft be always rotated in the same one direction, irrespective of whether the input shaft is rotated in one or the other direction by a rotary driving source or a reciprocating driving source. Some driving units of this type use a rotation transmission device to achieve this purpose, i.e. to convert rotation in either direction applied to the input shaft from a driving source to the rotation of the output shaft in a single direction.

FIGS. 13 and 14 show a conventional rotation transmission device of this type (which is disclosed in JP patent publication 2004-84783A). As shown in FIG. 13, this rotation transmission device comprises input and output shafts 51 and 52 which are coaxial with each other, a pair of opposed bevel gears 53 and 54 rotatably mounted around the output shaft 52, an intermediate bevel gear 55 meshing with both bevel gears 53 and 54, a first one-way clutch 56 disposed between the input shaft 51 and the output shaft 52, a second one-way clutch 57 disposed between the input shaft 51 and one of the opposed bevel gears 53, and a third one-way clutch 58 disposed between the other of the opposed bevel gears 54 and the output shaft 52.

As shown in FIGS. 14(a) to 14(c), the one-way clutches 56, 57 and 58 each comprise an outer ring 59 having a plurality of inclined cam surfaces 60 on its inner periphery, rollers 61 disposed at the circumferential positions where there are the respective cam surfaces 60, and springs 62 biasing the respective rollers 61 toward the positions where the rollers 61 are locked by the respective cam surfaces 60. Of these clutches, the first and third one-way clutches 56 and 58 are mounted such that when the outer ring 59 rotates in the normal direction (counterclockwise direction in the figures), the rollers 61 are locked by the respective cam surfaces 60, while the second one-way clutch 57 is mounted such that when the outer ring 59 rotates in the reverse direction (clockwise direction in the figures), the rollers 61 are locked by the respective cam surfaces 60.

Thus, when the input shaft 51 or the bevel gear 54, which are rotationally fixed to the outer rings 59 of the first and third one-way clutches 56 and 58, respectively, rotate in the normal direction, or when the output shaft 52 rotates in the reverse direction, their respective rotations are transmitted through the first and the third one-way clutches 56 and 58. When the input shaft 51, which is rotationally fixed to the outer ring 59 of the second one-way clutch 57, rotates in the reverse direction, or when the bevel gear 53 rotates in the normal direction, their respective rotations are transmitted through the second one-way clutch 57.

Now description is made of the operation of this device when the input shaft 51 is rotated by a driving source. In FIGS. 13 and 14, the solid arrows indicate the rotational directions of the respective elements when the input shaft 51 is rotated in the normal direction, while the arrows of one-dot chain lines indicate the rotational directions of the respective elements when the input shaft 51 is rotated in the reverse direction.

When the input shaft 51 is rotated in the normal direction, its rotation is transmitted to the output shaft 52 through the first one-way clutch 56. At this time, since the rotation of the input shaft 51 in the normal direction is not transmitted to the bevel gear 53 through the second one-way clutch 57, and the rotation of the output shaft 52 in the normal direction is not transmitted to the bevel gear 54 through the third one-way clutch 58, the bevel gears 53, 54 and 55 all remain stationary. When the input shaft 51 is rotated in the reverse direction, the reverse rotation of the input shaft 51 is transmitted to the bevel gear 53 through the second one-way clutch 57, and then transmitted to the bevel gear 54 through the intermediate bevel gear 55, thus rotating the bevel gear 54 in the normal direction. The rotation of the bevel gear 54 in the normal direction is transmitted to the output shaft 52 through the third one-way clutch 58. At this time, since the input shaft 51 is rotated in the reverse direction, and the output shaft 52 is rotated in the normal direction, no rotation is transmitted through the first one-way clutch 56. Thus, this rotation transmission device can rotate the output shaft 52 always in the normal direction irrespective of whether the input shaft 51 is rotated in the normal or reverse direction.

But since the rotation transmission device disclosed in JP patent publication 2004-84783A includes three one-way clutches, a large number of parts are necessary. Also, during operation, the clutches tend to become out of alignment with each other, which causes uneven transmission of torque and increases operational torque.

Many of today's copiers, printers and other business machines have the function of printing both sides of each sheet of paper to conserve paper. In order to print both sides, a mechanism is necessary for reversing the feed direction of paper sheets. One of such mechanisms includes two driving sources, one for rotating the paper feed roller in the normal direction, thereby feeding the sheet in the paper discharge direction, and the other for rotating the paper feed roller in the reverse direction, thereby feeding the sheet in the reverse direction (JP patent publication 2002-154727A). Another mechanism uses a spring clutch to simplify the mechanism and reduce the cost (JP patent publication 2009-8247A).

The rotation transmission device using such a spring clutch includes first and second input gears that are coaxial with each other. When driving torque is applied to the first input gear, the clutch spring, which is provided on the first input gear, becomes locked, thereby rotating the output gear in the same direction as the first input gear, and thus rotating the paper feed roller in the normal direction. In this state, the second input gear is kept disengaged by e.g. an electromagnetic clutch, so that no driving torque is applied to the second input gear. Thus, the first input gear and the output gear rotate in unison. In this state, when driving torque in the reverse direction is applied to the second input gear by activating e.g. the electromagnetic clutch, the spring clutch of the first input gear becomes disengaged by the second input gear, so that the output gear now rotates in the same direction as the second input gear, thereby rotating the paper feed roller in the reverse direction.

With this rotation transmission device, it is necessary to provide the first input gear with the spring clutch and also to provide means, such as an electromagnetic clutch, for cutting off transmission of driving torque to the second input gear while the first input gear is being driven, these members add to the number of parts of the rotation transmission. It is thus difficult to assemble the rotation transmission device. Further, the spring clutch tends to increase operational torque due to sliding torque of the clutch, or produce noise and cause other problems due to malfunction of the clutch.

SUMMARY OF THE INVENTION

An object of the present invention is to provide a rotation transmission device which is simple in structure and which can stably transmit rotation.

As a first means to achieve this object, the present invention provides a rotation transmission device comprising an input shaft and an output shaft which are coaxial with each other and configured to convert rotation of the input shaft in either of a normal direction and a reverse direction to rotation of the output shaft in one direction, characterized in that the rotation transmission device further comprises opposed first and second bevel gears, an intermediate bevel gear meshing with the first and second bevel gears, the first bevel gear being rotationally fixed to the output shaft, a first one-way clutch through which rotation of the input shaft in the normal direction is configured to be transmitted to the output shaft or the first bevel gear, and a second one-way clutch through which rotation of the input shaft in the reverse direction is configured to be transmitted to the second bevel gear.

With this arrangement, when the input shaft rotates in the normal direction, its rotation in the normal direction is transmitted to the output shaft or the first bevel gear, which rotates in unison with the output shaft, through the first one-way clutch. When the input shaft rotates in the reverse direction, its rotation is transmitted to the second bevel gear through the second one-way clutch, and then to the first bevel gear and the output shaft through the intermediate bevel gear, thereby rotating the first bevel gear and the output shaft. This rotation transmission device thus needs only two one-way clutches, which means that this device comprises a smaller number of parts than conventional devices, which need three one-way clutches. Also, the two clutches of the present invention are less likely to get out of alignment with each other during rotation of the device.

As a second means to achieve the above-mentioned object, the present invention provides a rotation transmission device comprising an input shaft and an output shaft which are coaxial with each other and configured to convert rotation of the input shaft in either of a normal direction and a reverse direction to rotation of the output shaft in one direction, characterized in that the rotation transmission device further comprises opposed first and second bevel gears, an intermediate bevel gear meshing with the first and second bevel gears, the first bevel gear being rotationally fixed to the input shaft, a first one-way clutch through which rotation of the input shaft or the first bevel gear in the normal direction is configured to be transmitted to the output shaft, and a second one-way clutch through which rotation of the second bevel gear in the normal direction is configured to be transmitted to the output shaft.

With this arrangement, when the input shaft rotates in the normal direction, its rotation or the rotation of the first bevel gear, which rotates in unison with the input shaft in the normal direction, is transmitted to the output shaft through the first one-way clutch, thereby rotating the output shaft in the normal direction. When the input shaft rotates in the reverse direction, its rotation is transmitted to the second bevel gear through the first bevel gear and the intermediate bevel gear, thereby rotating the second bevel gear in the normal direction, and then rotating the output shaft in the normal direction through the second one-way clutch. Thus, in the same manner as the first means, this rotation transmission device also needs only two one-way clutches. It is thus possible to reduce the number of parts, and to reduce problems resulting from misalignment of the clutches.

In either of the first and second means, the first and second one-way clutches are preferably identical in specifications (i.e., structure) to each other to simplify handling and management of the parts of the one-way clutches before assembling the clutches.

Preferably, at least one of the first and second bevel gears has rotation transmission means through which rotation can be transmitted between the at least one of the first and second bevel gears and an external rotary member. With this arrangement, the opposed first and second bevel gears having the rotation transmission means can be used as one of the input shaft and the output shaft. This makes it possible to reduce the axial dimension of the entire device.

The rotation transmission means may be a ring gear.

As a third means to achieve the object of the present invention, there is provided a rotation transmission device comprising a fixed shaft, intermediate shafts provided around the fixed shaft to extend perpendicular to the fixed shaft, a first input shaft and an output shaft rotatably mounted around the fixed shaft with the intermediate shafts disposed therebetween, bevel gears provided on the respective opposed surfaces of the first input member and the output member, and intermediate bevel gears rotatably mounted on the respective intermediate shafts and each meshing with the bevel gears of the first input member and the output member, the intermediate shafts and the intermediate bevel gears constituting a second input member, wherein with the first input member rotating, by changing the orbiting speed of the intermediate bevel gears of the second input member to below or above half the rotating speed of the first input member, it is possible to reverse the rotating direction of the output member.

Alternatively, the rotation transmission device may comprise a fixed shaft, intermediate shafts provided around the fixed shaft to extend perpendicular to the fixed shaft, a second input shaft and an output shaft rotatably mounted around the fixed shaft with the intermediate shafts disposed therebetween, bevel gears provided on the respective opposed surfaces of the second input member and the output member, and intermediate bevel gears rotatably mounted on the respective intermediate shafts and each meshing with the bevel gears of the second input member and the output member, the intermediate shafts and the intermediate bevel gears constituting a first input member, wherein with intermediate shafts of the first input member rotating, by changing the rotating speed of the second input member to below or above twice the rotating speed of the intermediate shafts about the fixed shaft, it is possible to reverse the rotating direction of the output member.

In these arrangements, by combining the bevel gears of the first and second input members and the bevel gear of the output member, and by changing the rotating (orbiting) speed of the bevel gears of the second input member around the fixed shaft to reverse the rotating direction of the output member, it is possible to eliminate the need for a spring clutch used in conventional devices and also simplify the structure and stably reverse the rotating direction of the output member.

With this arrangement, preferably, ring gears are provided on the first input member, second input member and output member, respectively, so as to be coaxial with the fixed shaft, with the ring gear of the first input member connected to a first drive gear, the ring gear of the second input member connected to a second drive gear, and the ring gear of the output member connected to a driven gear.

The present invention is applicable to rotation transmission devices mounted in copiers, printers and other business machines.

With the rotation transmission device according to the present invention, particularly the above-mentioned first and second means, using the two one-way clutches, it is possible to rotate the output shaft always in one direction irrespective of whether the input shaft is rotating in the normal direction or the reverse direction. Thus the rotation transmission device of the invention is made up of a smaller number of parts than conventional devices, which use three one-way clutches. Further it is possible to minimize problems resulting from misalignment of the clutches, which makes it possible to more stably transmit rotation.

With the above-mentioned third means, by the combination of the bevel gears, it is possible to reverse the rotating direction of the output member without using a spring clutch. Thus, this rotation transmission device is simpler in structure and comprises a smaller number of parts than conventional devices using a spring clutch, and also can be assembled more easily. Moreover, the rotation transmission device produces less operation torque, is free of problems resulting from defective clutch operation, and is also free of noise during idling. Thus, this device can stably reverse the rotating direction of the output shaft over a prolonged period of time.

BRIEF DESCRIPTION OF THE DRAWINGS

FIG. 3 is sectional front view of a rotation transmission device according to a second embodiment.

FIGS. 4(a) and 4(b) are sectional views taken along lines A-A and B-B of FIG. 3, respectively.

FIG. 5 is sectional front view of a rotation transmission device according to a third embodiment.

FIGS. 6(a) and 6(b) are sectional views taken along lines A-A and B-B of FIG. 5, respectively.

FIGS. 10(a) and 10(b) are sectional views taken along lines A-A and B-B of FIG. 9, respectively.

FIGS. 14(a), 14(b) and 14(c) are sectional views taken along lines A-A, B-B and C-C of FIG. 13, respectively.

FIGS. 16(a) and 16(b) show different operational states of the rotation transmission device of FIG. 15.

DETAILED DESCRIPTION OF THE INVENTION

Figure 1:
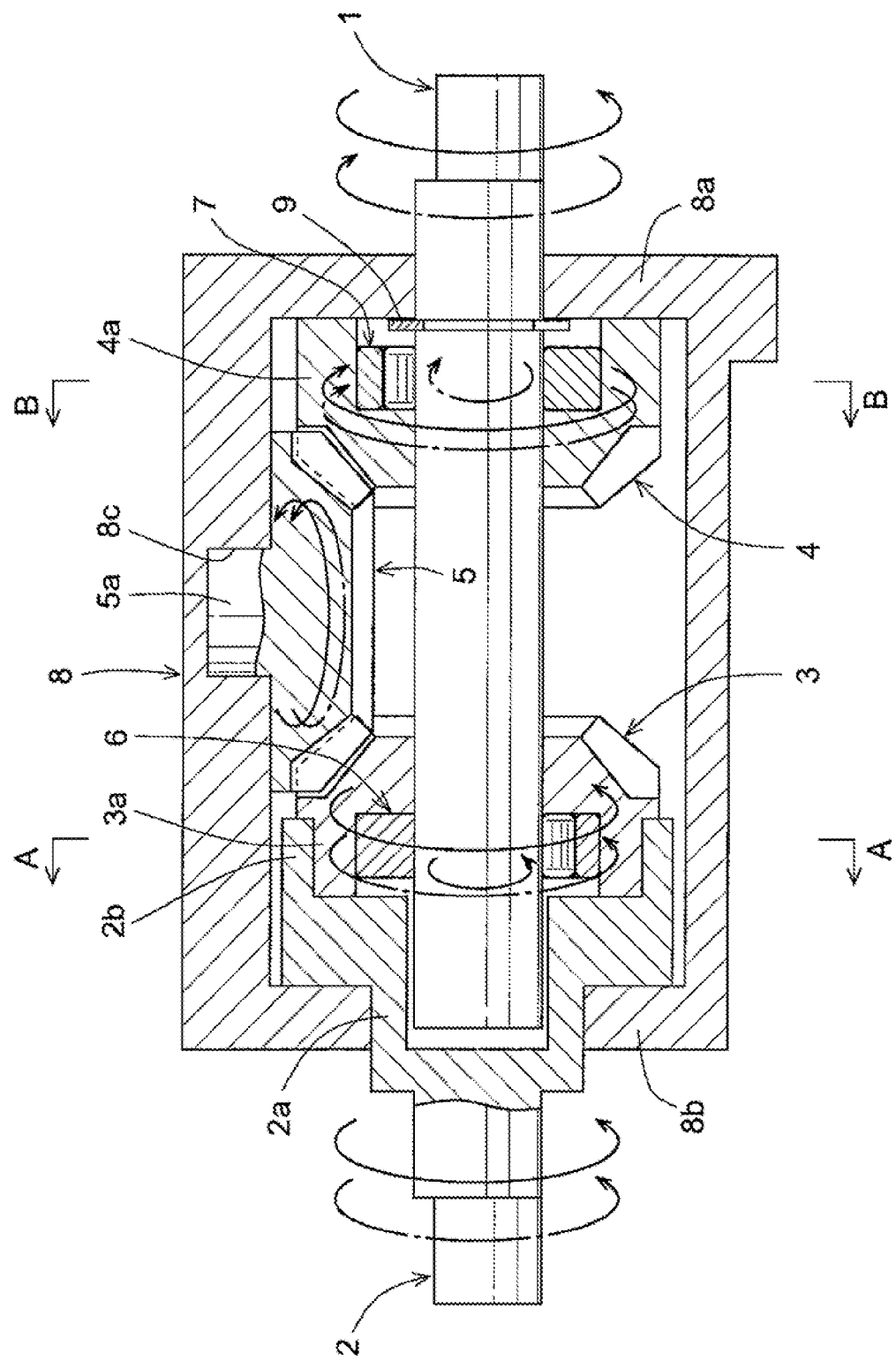
FIG. 1 is a sectional front view of a rotation transmission device according to a first embodiment.
Figure 2A:
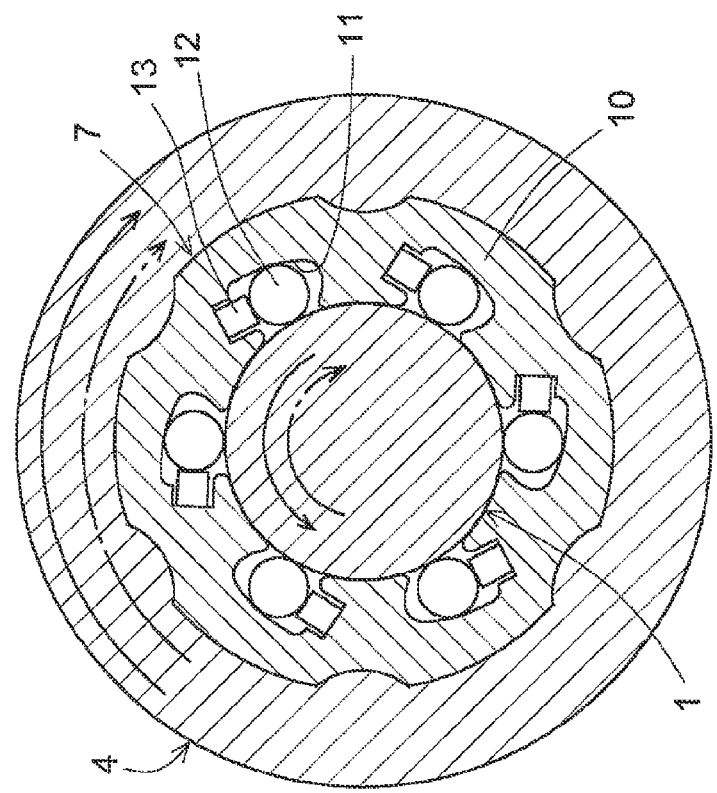
FIGS. 2(a) and 2(b) are sectional views taken along lines A-A and B-B of FIG. 1, respectively.
Figure 2B:
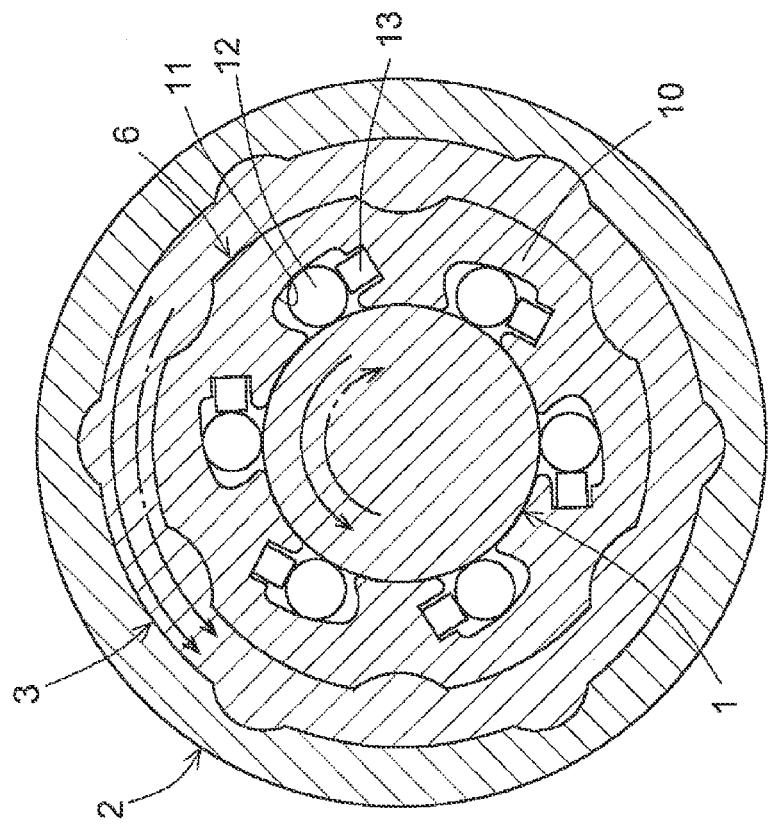

Now the embodiments are described with reference to the drawings. FIGS. 1, 2(a) and 2(b) show the first embodiment.

As shown in FIG. 1, the rotation transmission device of this embodiment comprises input and output shafts 1 and 2 which are coaxial with each other, a pair of opposed bevel gears 3 and 4 rotatably mounted around the input shaft 1, an intermediate bevel gear 5 meshing with both bevel gears 3 and 4, a first one-way clutch 6 disposed between the input shaft 1 and one of the opposed bevel gears on the input side, i.e. bevel gear 3, and a second one-way clutch 7 disposed between the input shaft 1 and the other of the opposed bevel gears (on the output side), i.e. bevel gear 4. The input shaft 1 and the output shaft 2 are rotatably supported by inner surfaces of through holes formed in end walls 8a and 8b of a tubular casing 8, respectively. The intermediate bevel gear 5 has a shaft portion 5a rotatably fitted in a circular hole 8c formed in the inner surface of the casing 8. While not shown, the casing 8 comprises two separate members which are joined together after the input and output shafts 1 and 2, the bevel gears 3, 4 and 5, and the one-way clutches 6 and 7 have been mounted in position.

The output shaft 2 has a small-diameter tubular portion 2a rotatably supported by a lid portion 8b of the casing, and a large-diameter tubular portion 2b to which the bevel gear 3 (on the output side) is connected, with a shoulder defined therebetween. The input shaft 1 has a first end portion thereof inserted in the tubular portions 2a and 2b of the output shaft 2, and is prevented from separation by a snap ring 9. The opposed pair of bevel gears 3 and 4 have tubular portions 3a and 4a in which the one-way clutches 6 and 7 are received, respectively. The bevel gear 3 on the output side has its tubular portion 3a fitted in the large-diameter tubular portion 2b of the output shaft 2 so as to be rotationally fixed to the output shaft 2. The one-way clutch 6 is operably coupled with the input shaft at a position such that the first end portion of the input shaft 1 extends axially beyond the one-way clutch 6 in a direction away from a second end portion of the input shaft 1 (i.e., away from the one-way clutch 7).

As shown in FIGS. 2(a) and 2(b), each of the one-way clutches 6 and 7 comprises an outer ring 10 having a plurality of inclined cam surfaces 11 on its inner periphery, rollers 12 as engaging elements disposed at the circumferential positions where there are the respective cam surfaces 11, and springs 13 biasing the respective rollers 12 toward the positions where the rollers 12 are locked by the respective cam surfaces 11. The one-way clutches 6 and 7 are identical in structure and specifications. The first one-way clutch 6 is mounted such that when the outer ring 10 rotates in the reverse direction (clockwise in the figures), the rollers 12 are locked by the cam surfaces 11, while the second one-way clutch 7 is mounted such that when the outer ring 10 rotates in the normal direction (counterclockwise in the figures), the rollers 12 are locked by the cam surfaces 11.

Thus, when the bevel gear 3 on the output side, which is rotationally fixed to the outer ring 10 of the first one-way clutch 6, rotates in the reverse direction or when the input shaft 1 rotates in the normal direction, their rotations are transmitted through the first one-way clutch 6. When the bevel gear 4 on the input side, which is rotationally fixed to the outer ring 10 of the second one-way clutch 7, rotates in the normal direction or when the input shaft 1 rotates in the reverse direction, their rotations are transmitted through the second one-way clutch 7.

Now description is made of the operation of this device when the input shaft 1 is rotated by a driving source (not shown). In FIGS. 1, 2(a) and 2(b) (as well as in the later described other embodiments), solid arrows indicate the rotational directions of the respective elements when the input shaft 1 is rotated in the normal direction, while the arrows of one-dot chain lines indicate the rotational directions of the respective elements when the input shaft 1 is rotated in the reverse direction.

When the input shaft 1 is rotated in the normal direction, its rotation is transmitted to the bevel gear 3 on the output side through the first one-way clutch 6, so that the output shaft 2 rotates in the normal direction together with the bevel gear 3. The rotation in the normal direction of the bevel gear 3 on the output side is transmitted to the bevel gear 4 on the input side through the intermediate bevel gear 5, thereby rotating the bevel gear 4 in the reverse direction. But the rotation of the bevel gear 4 in the reverse direction is not transmitted through the second one-way clutch 7.

When the input shaft 1 is rotated in the reverse direction, the reverse rotation of the input shaft 1 is transmitted to the bevel gear 4 on the input side through the second one-way clutch 7. The rotation of the bevel gear 4 in the reverse direction is transmitted to the bevel gear 3 on the output side through the intermediate bevel gear 5, thereby rotating the bevel gear 3 in the normal direction, so that the output shaft 2 is also rotated in the normal direction together with the bevel gear 3. At this time, since the input shaft 1 is rotated in the reverse direction, and the bevel gear 3 on the output side is rotated in the reverse direction, rotation is not transmitted through the first one-way clutch 6.

Figure 13:
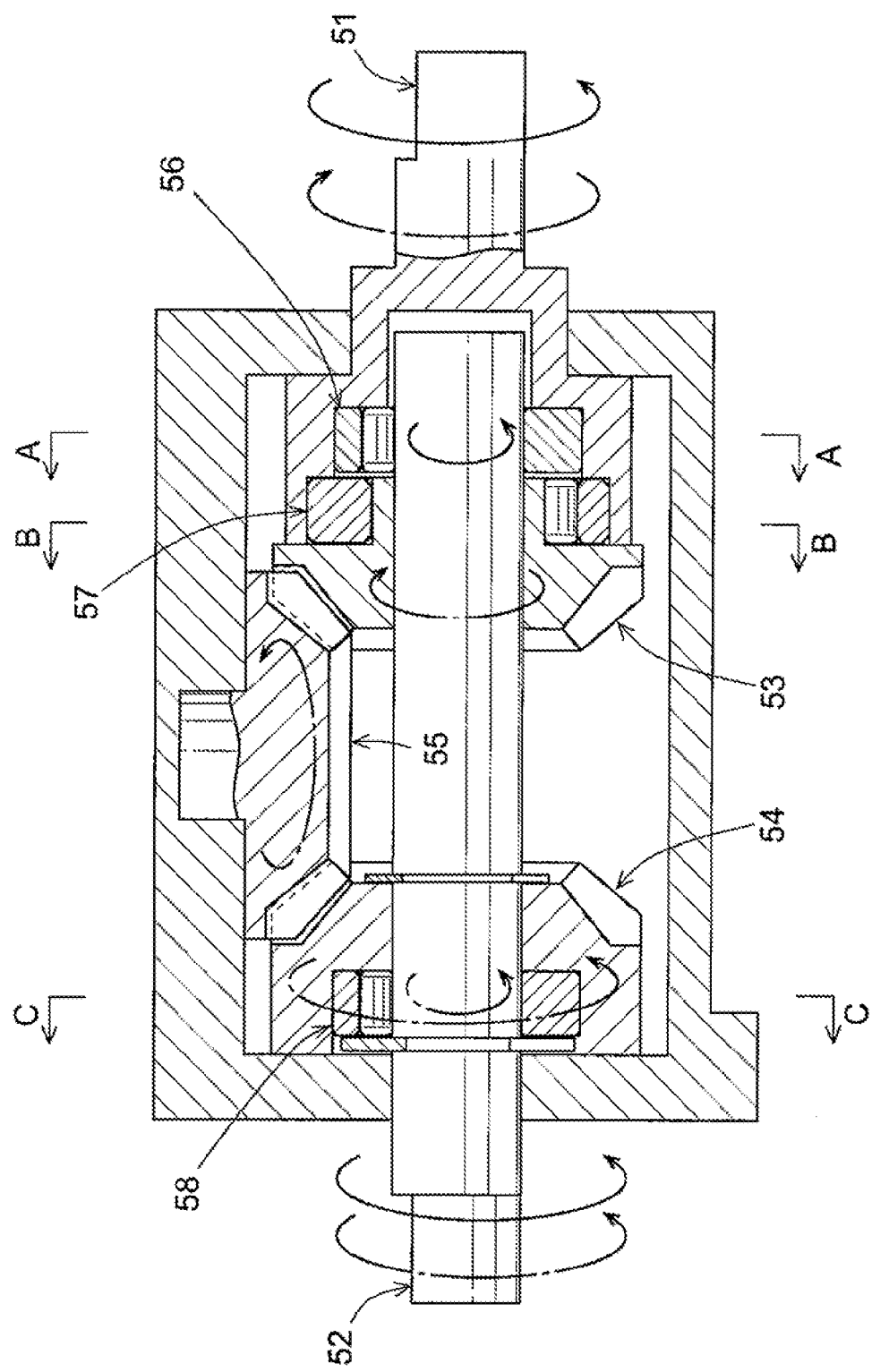
FIG. 13 is a sectional front view of a conventional rotation transmission device.

With this rotation transmission device, using only the two one-way clutches 6 and 7, it is possible to always rotate the output shaft 2 in the normal direction, irrespective of whether the input shaft 1 is rotated in the normal direction or in the reverse direction. Thus, compared to the conventional device shown in FIGS. 13 and 14(*a*)-(*c*), which uses three one-way clutches, the device of the present invention is made up of a smaller number of parts and thus is simple in structure. Moreover, the two clutches of the present invention are less likely to get out of alignment with each other, so that the device of the present invention can be rotated more stably. Also, while one of the three one-way clutches used in the above-mentioned conventional device has a different diametric dimension from the other two, the two one-way clutches 6 and 7 of the present invention are of the same dimensions (specifications). This makes it easier to control the parts of these clutches before assembly.

FIGS. 3, 4(*a*) and 4(*b*) show the second embodiment. In this embodiment, the input and output shafts of the first embodiment are used as output and input shafts, respectively, and the two one-way clutches are mounted in position so as to be orientated in the same direction. More specifically, as shown in FIG. 3, the input shaft 14 of this embodiment is of the same structure as the output shaft 2 of the first embodiment, while the output shaft 15 is of the same structure as the input shaft 1 of the first embodiment. As shown in FIGS. 4(*a*) and 4(*b*), both the first one-way clutch 16 provided between the bevel gear 3 on the input side and the output shaft 15 and the second one-way clutch 17 provided between the bevel gear 4 on the output side and the output shaft 15 are mounted such that when their outer rings 10 rotate in the normal direction, the rollers 1 are locked by the cam surfaces 12. Otherwise, this embodiment is identical in structure to the first embodiment.

In this embodiment, when the input shaft 14 rotates together with the bevel gear 3 on the input side in the normal direction, its rotation is transmitted to the output shaft 15 through the first one-way clutch 16, thus rotating the output shaft 15 in the normal direction. At this time, the rotation of the bevel gear 3 on the input side is transmitted to the bevel gear 4 on the output side through the intermediate bevel gear 5, thereby rotating the bevel gear 4 in the reverse direction. But rotation is not transmitted through the second one-way clutch 17.

When the input shaft 14 rotates together with the bevel gear 3 on the input side in the reverse direction, its rotation is transmitted to the bevel gear 4 on the output side through the intermediate bevel gear 5, thereby rotating the bevel gear 4 in the normal direction. The rotation of the bevel gear 4 in the normal direction is transmitted to the output shaft 15 through the second one-way clutch 17. At this time, since the bevel gear 3 on the input side is rotating in the reverse direction, and the output shaft 15 is rotating in the normal direction, no rotation is transmitted through the first one-way clutch 16.

Thus, in this embodiment too, using only the two one-way clutches 16 and 17, it is possible to always rotate the output shaft 15 in the normal direction irrespective of whether the input shaft 14 is rotated either in the normal direction or in the reverse direction. Thus, this embodiment has the same advantage as the first embodiment.

Figure 7:
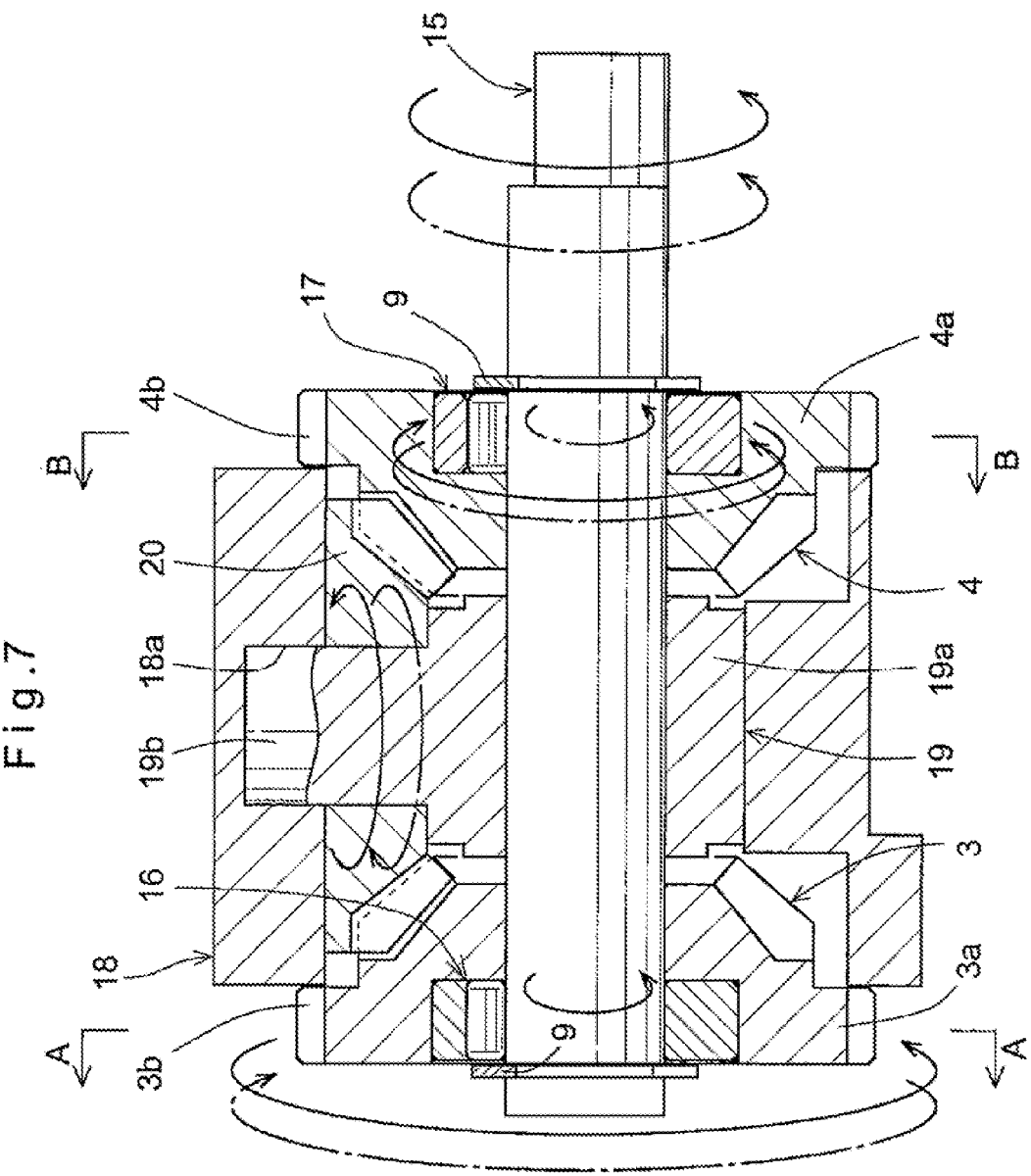
FIG. 7 is sectional front view of a rotation transmission device according to a fourth embodiment.
Figure 8A:
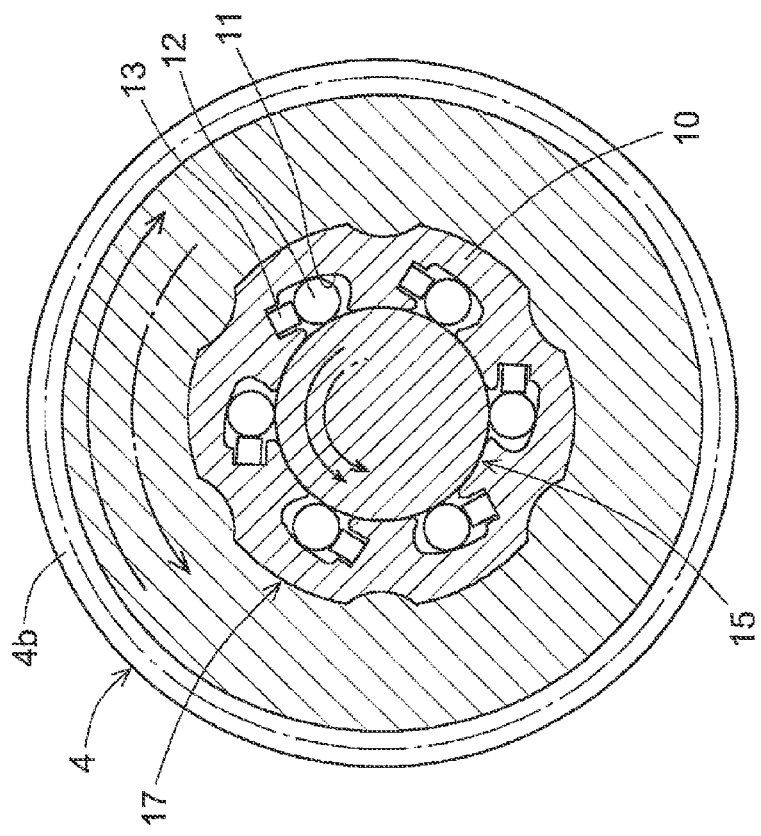
FIGS. 8(a) and 8(b) are sectional views taken along lines A-A and B-B of FIG. 7, respectively.
Figure 8B:
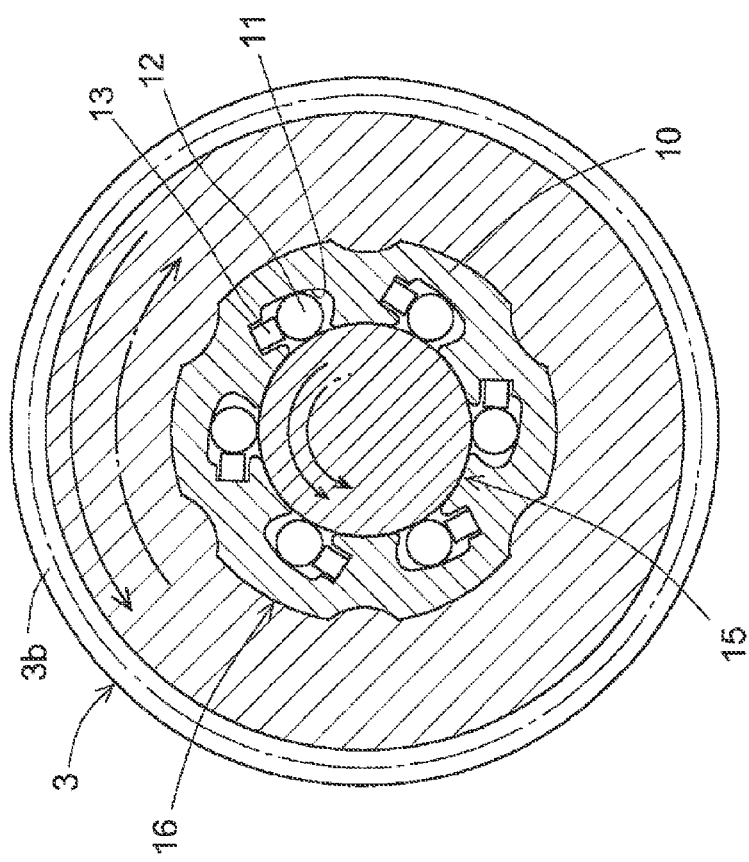

FIGS. 5, 6(*a*) and 6(*b*) show the third embodiment. FIGS. 7, 8(*a*) and 8(*b*) show the fourth embodiment. In these embodiments, ring gears 3*b* and 4*b* are provided on the respective opposed pair of bevel gears 3 and 4 of the first and second embodiments, respectively. The ring gears 3*b* and 4*b* serve as rotation transmission means through which rotation can be transmitted between the opposed bevel gears 3 and 4 and an external rotary member (not shown). Thus, in the third and fourth embodiments, the opposed bevel gears 3 and 4 serve as an output shaft or an input shaft.

These embodiments include a casing 18 having openings at both ends. A support member 19 is mounted in the casing 18 which comprises a cylindrical portion 19*a* through which an input shaft 1 (third embodiment) or an output shaft 15 (fourth embodiment) extends, and a columnar portion 19*b* inserted through a shaft hole formed in the intermediate bevel gear 20. The support member 19 is fixed in position by bringing its cylindrical portion 19*a* partially in abutment with the inner periphery of the casing 18, and inserting the columnar portion 19*b* in a circular hole 18*a* formed in the inner periphery of the casing 18. The support member 19 thus rotatably supports the input shaft 1 or the output shaft 15 on the inner periphery of the cylindrical portion 19*a* and also rotatably supports the intermediate bevel gear 20 on the columnar portion 19*b*. Two snap rings 9 prevent separation of the input shaft 1 or the output shaft 15, which is supported by the support member 19.

The ring gears 3*b* and 4*b* are provided on the respective bevel gears 3 and 4 at their portions axially protruding from the casing 18. Rotation is transmitted between the bevel gears 3 and 4 and an external rotary member through the ring gears 3*b* and 4*b*. Thus, the bevel gears 3 and 4 serve as an output shaft or an input shaft. This eliminates the need for the output shaft 2 of the first embodiment (or the input shaft 14 of the second embodiment). Otherwise, both structurally and operationally, the third embodiment is identical to the first embodiment and the fourth embodiment is identical to the second embodiment. As a result, the devices of the third and fourth embodiments are shorter in axial dimension than the devices of the first and second embodiments.

The rotation transmission means for transmitting rotation between the opposed bevel gears and an external rotary member is not limited to the ring gears as shown but may be e.g. pulleys instead.

Figure 9:
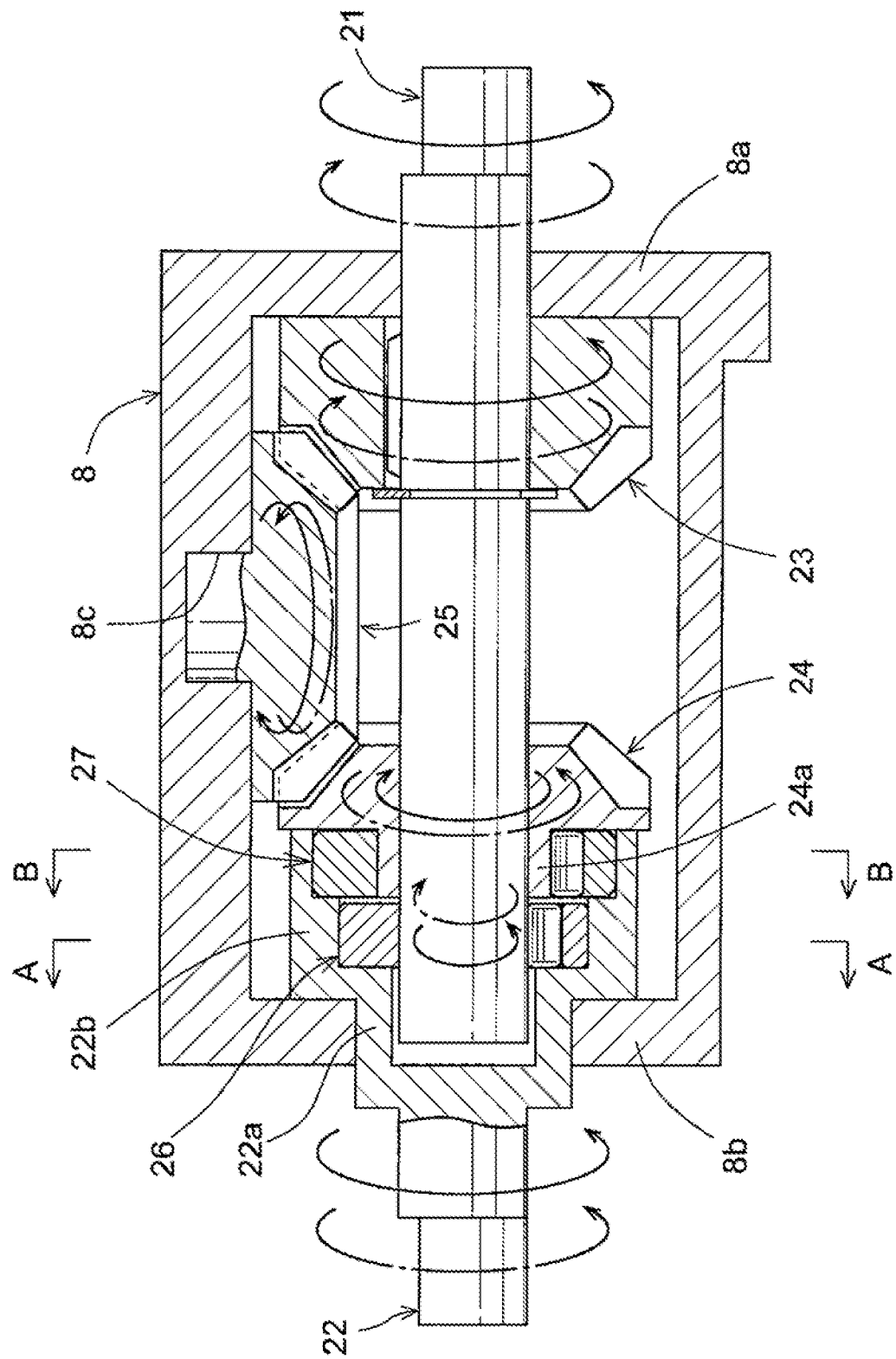
FIG. 9 is sectional front view of a rotation transmission device according to a fifth embodiment.

FIGS. 9, 10(*a*) and 10(*b*) show the fifth embodiment. As shown in FIG. 9, the rotation transmission device of this embodiment includes, as in the first embodiment, input and output shafts 21 and 22 that are coaxial with each other, a pair of opposed bevel gears 23 and 24 fitted around the input shaft 21, an intermediate bevel gear 25 meshing with both bevel gears 23 and 24, two one-way clutches 26 and 27, and a tubular casing 8 in which the bevel gears 23, 24 and 25 and the one-way clutches 26 and 27 are mounted. The input shafts 21 and 22 and the intermediate bevel gear 25 are rotatably supported by the casing 8 in the same manner as in the first embodiment.

This embodiment differs from the first embodiment in that the input shaft 21 and the bevel gear 23 on the input side are rotationally fixed to each other, that the first one-way clutch 26 is disposed between the input shaft 21 and the output shaft 22, while the second one-way clutch 27, which is larger in diameter than the first one-way clutch 26, is disposed between the bevel gear 24 on the output side and the output shaft 22, and that the one-way clutches 26 and 27 are oriented in the same direction.

The output shaft 22 comprises a small-diameter tubular portion 22a rotatably supported by a lid portion 8b of the casing, and a large-diameter tubular portion 22b in which the two one-way clutches 26 and 27 are mounted, with a shoulder defined therebetween. The bevel gear 23 on the input side is rotationally fixed to the input shaft 21 by keys. The bevel gear 24 on the output side has a tubular portion 24a inserted between the input shaft 21 and the second one-way clutch 27.

The one-way clutches 26 and 27 are basically of the same structure as those of the first embodiment, and are mounted, see FIGS. 10(a) and 10(b), such that when their respective outer rings 10 rotate in the reverse direction, the rollers 12 are locked by the cam surfaces 11. Thus, when the input shaft 21 rotates in the normal direction, its rotation is transmitted through the first one-way clutch 26, and when the bevel gear 24 on the output side rotates in the normal direction, its rotation is transmitted through the second one-way clutch 27.

Thus, when the input shaft 21 rotates together with the bevel gear 23 on the input side in the normal direction, its rotation is transmitted to the output shaft 22 through the first one-way clutch 26, thus rotating the output shaft 22 in the normal direction. At this time, the rotation of the bevel gear 23 on the input side in the normal direction is transmitted to the bevel gear 24 on the output side through the intermediate bevel gear 25, thus rotating the bevel gear 24 in the reverse direction. But no rotation is transmitted through the second one-way clutch 27 in this state.

When the input shaft 21 rotates together with the bevel gear 23 on the input side in the reverse direction, the reverse rotation of the bevel gear 23 is transmitted to the bevel gear 24 on the output side through the intermediate bevel gear 25, thereby rotating the bevel gear 24 in the normal direction. Then, the rotation of the bevel gear 24 in the normal direction is transmitted to the output shaft 22 through the second one-way clutch 27. In this state, since the input shaft 21 is rotating in the reverse direction, while the output shaft 22 is rotating in the normal direction, no rotation is transmitted through the first one-way clutch 26.

Figure 11:
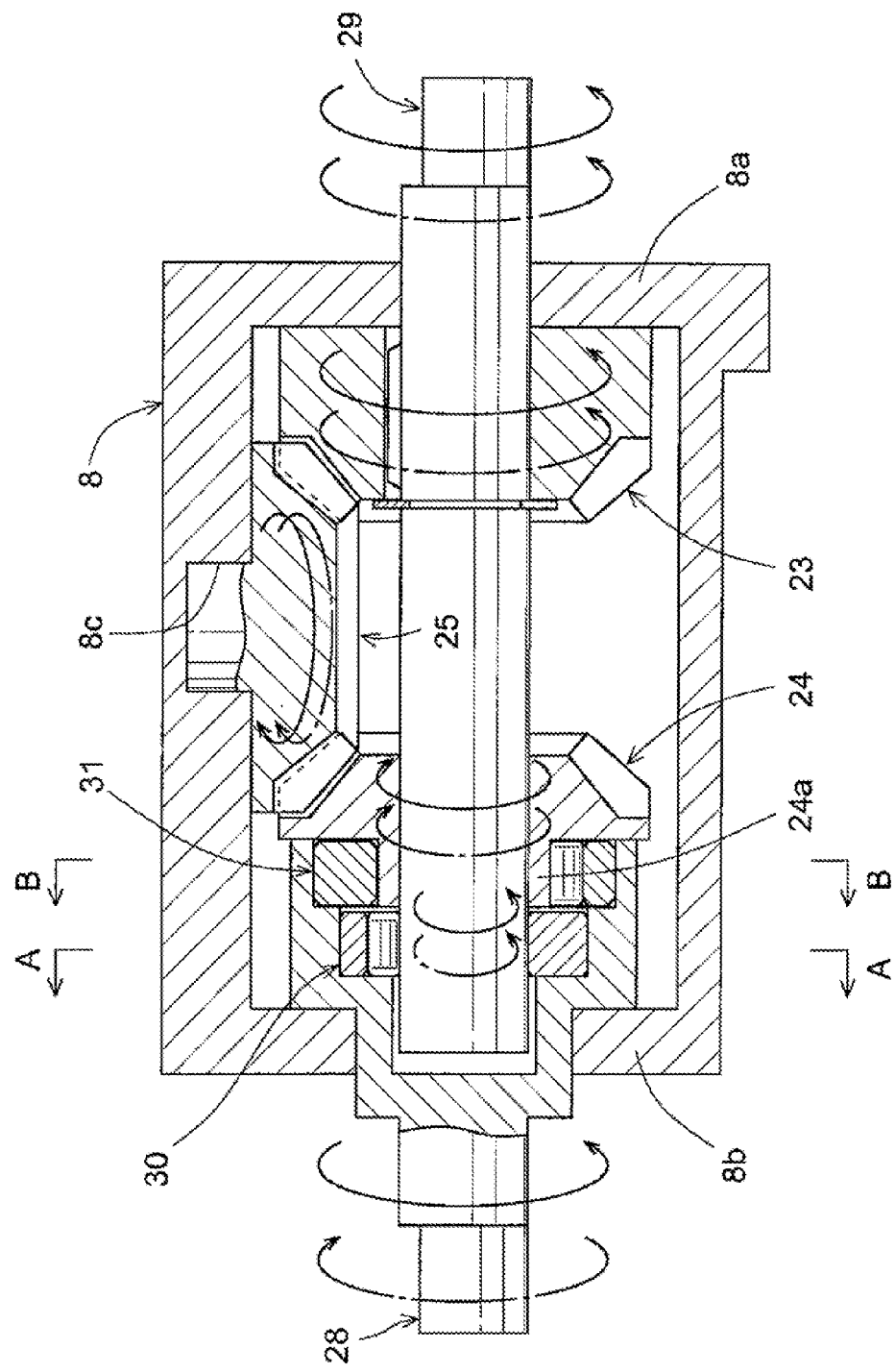
FIG. 11 is sectional front view of a rotation transmission device according to a sixth embodiment.
Figure 12A:
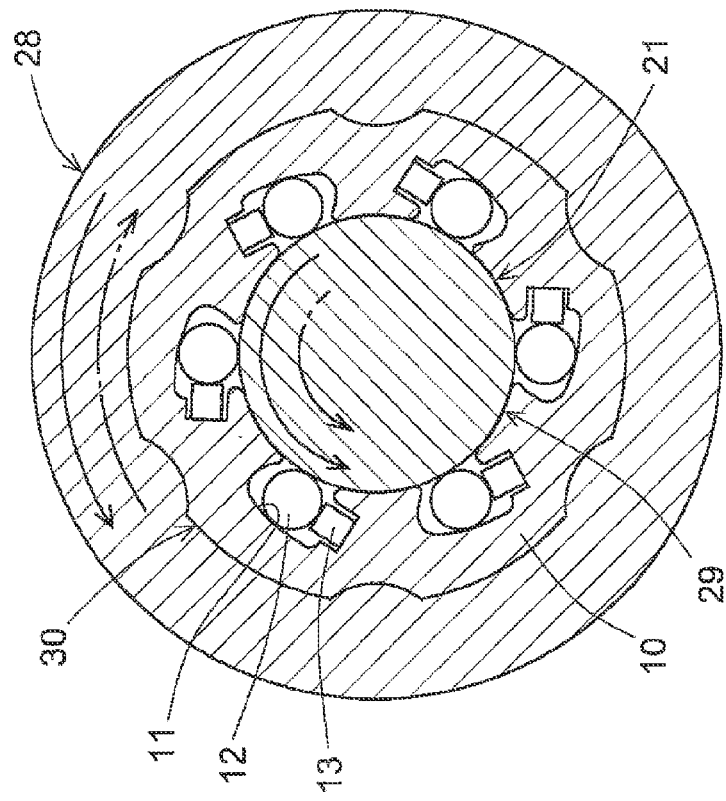
FIGS. 12(a) and 12(b) are sectional views taken along lines A-A and B-B of FIG. 11, respectively.
Figure 12B:
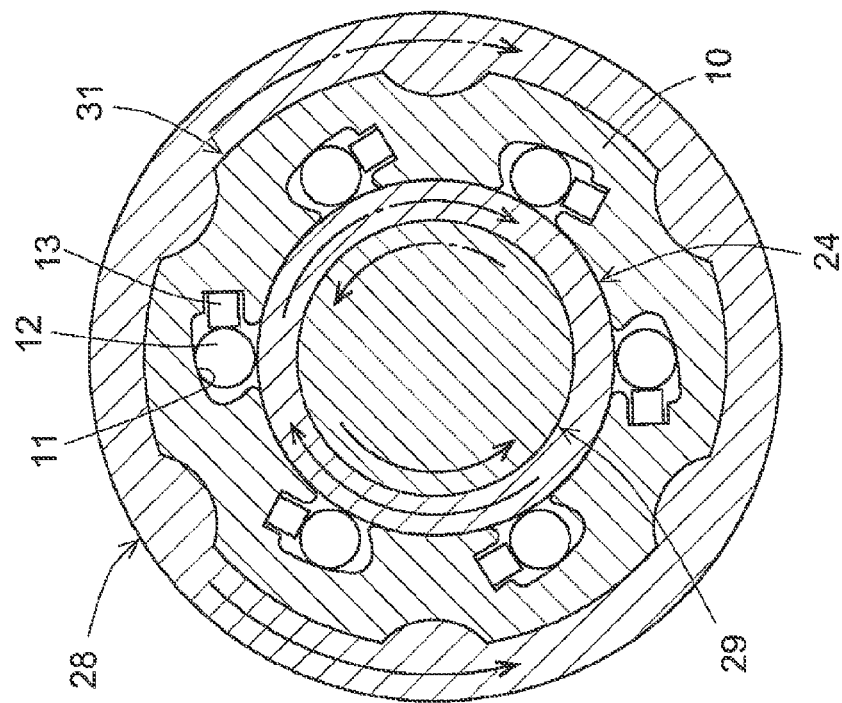

FIGS. 11, 12(a) and 12(b) show the sixth embodiment. The rotation transmission of this embodiment is the same as that of the fifth embodiment, except that the input and output shafts of the fifth embodiment are used as output and input shafts, respectively, in this embodiment, and that the two one-way clutches are oriented in opposite directions to each other. Specifically, as shown in FIG. 11, the input shaft 28 of this embodiment is of the same structure as the output shaft 22 of the fifth embodiment, and the output shaft 29 is of the same structure as the input shaft 21 of the fifth embodiment. The first one-way clutch 30 is mounted between the input shaft 28 and the output shaft 29 such that when its outer ring 10 rotates in the normal direction, the rollers 12 are locked by the cam surfaces 11. The second one-way clutch 31 is mounted between the input shaft 28 and the bevel gear 24 on the input side such that when its outer ring 10 rotates in the reverse direction, the rollers 12 are locked by the cam surfaces 11. Otherwise, this embodiment is structurally identical to the fifth embodiment.

In this embodiment, when the input shaft 28 rotates in the normal direction, its rotation is transmitted to the output shaft 29 through the first one-way clutch 30, thereby rotating the output shaft 29 in the normal direction. At this time, the bevel gear 23 on the output side is rotated in the normal direction together with the output shaft 29, and its rotation is transmitted to the bevel gear 24 on the input side through the intermediate bevel gear 25, thereby rotating the bevel gear 24 in the reverse direction. But no rotation is transmitted through the second one-way clutch 31.

When the input shaft 28 rotates in the reverse direction, its rotation is transmitted to the bevel gear 24 on the input side through the second one-way clutch 31, thereby rotating the bevel gear 24 in the reverse direction. The reverse rotation of the bevel gear 24 is in turn transmitted to the bevel gear 23 on the output side, thereby rotating the bevel gear 23 in the normal direction, which in turn rotates the output shaft 29 in the normal direction because the output shaft 29 is rotationally fixed to the bevel gear 23. In this state, since the input shaft 28 is rotating in the reverse direction and the output shaft 29 is rotating in the normal direction, no rotation is transmitted through the first one-way clutch 30.

Thus, in the fifth and sixth embodiments too, as in the first to fourth embodiments, it is possible to always rotate the output shaft in the normal direction irrespective of whether the input shaft is rotated in the normal or reverse direction, using only the two one-way clutches.

In the above embodiments, rollers are used as engaging elements of the one-way clutches. But a different type of one-way clutches may be used instead, such as ones using e.g. sprags as rolling elements.

Figure 15:
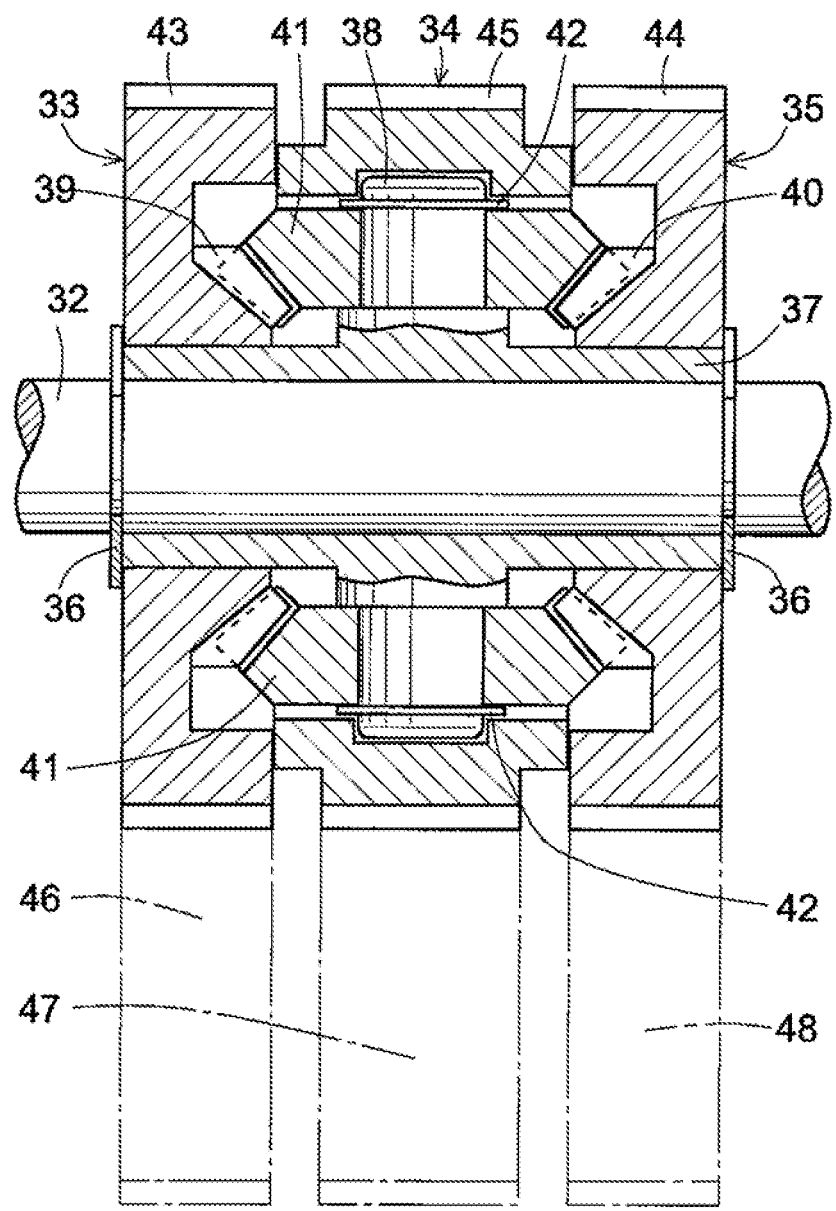
FIG. 15 is a sectional front view of a seventh embodiment.

FIGS. 15, 16(a) and 16(b) show the seventh embodiment. The rotation transmission device of this embodiment is mounted in business machines such as copiers and printers, and as shown in FIG. 15, basically comprises a fixed shaft 32, and a first input member 33, a second input member 34 and an output member 35 that are arranged around the fixed shaft 32. Snap rings 36 are fitted at both end portions of the fixed shaft 32 to prevent separation of the members 33, 34 and 35, which are provided around the fixed shaft 32.

The second input member 34 has a boss portion 37 rotatably fitted around the fixed shaft 32. The boss portion 37 has integral intermediate shafts 38 at its longitudinal central portion to extend perpendicular to the fixed shaft 32. The first input member 33 and the output member 35 are rotatably mounted around the boss portion 37 with the intermediate shaft 38 disposed between the first input member 33 and the output member 35.

The first input member 33 and the output member 35 carry bevel gears 39 and 40 on their respective opposed surfaces. The second input member 34 rotatably carries intermediate bevel gears 41 on the respective intermediate shafts 38 so as to be diametrically opposed to each other with respect to the fixed shaft 32 and to each mesh with the bevel gears 39 and 40 of the first input member 33 and the output member 35. Each of the intermediate bevel bears 41 of the second input member 34 is fitted on a small-diameter portion of the corresponding intermediate shaft 38 provided at its free end portion, and is held in position between a large-diameter portion of the intermediate shaft 38 and a snap ring 42 fitted on the intermediate shaft 38 at its free end.

Ring gears 43 and 44 are provided on the outer peripheries of the first input member 33 and the output member 35, respectively, so as to be coaxial with the fixed shaft 32. A ring gear 45 is provided on an outer periphery of the second input member 34 located radially outwardly of the free ends of the intermediate shafts 38 so as to be coaxial with the fixed shaft 32. A first drive gear 46 meshes with the ring gear 43 of the first input member 33; a second drive gear 47 meshes with the ring gear 45 of the second input member 34; and a driven gear 48 meshes with the ring gear 44 of the output member 35. A driving source (not shown) for driving the first input member 33 is connected to the first drive gear 46. A driving source (not shown either) for driving the second input member 34 is connected to the second drive gear 47.

Now the operation of this rotation transmission device is described. As shown in FIG. 16(*a*), when driving torque is applied to the first input member 33 through the first drive gear 46, while keeping the second input member 34 stationary, the rotation of the first input member 33 causes the intermediate bevel gears 41 of the second input member 34 to rotate about the intermediate shafts 38. The rotation of the intermediate bevel gears 41 about the shafts 38 in turn causes the output member 35 to rotate in the direction opposite to the rotating direction of the first input member 33. Thus, a paper feed roller (not shown) is rotated in the normal direction through the driven gear 48.

In the state of FIG. 16(*a*), when driving torque is applied to the second input member 34 through the second drive gear 47 in the same direction as the driving torque applied to the first input member 33, and the ring gear 45 of the second input member 34 rotates about the fixed shaft 32, the intermediate shafts 38 rotate and the intermediate bevel gears 41 revolve (orbit) around the fixed shaft 32, in unison with the ring gear 45.

In this state, if the orbiting speed of intermediate bevel gears 41 of the second input member 34 (rotating speed of the intermediate shafts 38) is lower than half the rotating speed of the first input member 33, the intermediate bevel gears 41 rotate about the shafts 38 and the output member 35 rotate at lower speeds than in the state of FIG. 16(*a*) but in the same directions as in FIG. 16(*a*). If the orbiting speed of the intermediate bevel gears 41 is half the rotating speed of the first input member 33, the orbiting speed of the intermediate bevel gears 41 is equal to its rotating speed about the shafts 38. Thus, the output member 35 does not rotate in this state. If the orbiting speed of the intermediate bevel gears 41 is higher than half the rotating speed of the first input member 33, the orbiting speed of the intermediate bevel gears 41 is higher than its rotating speed about the shafts 38. Thus in this state, as shown in FIG. 16(*b*), the output member 35 rotates in the direction opposite to its rotating direction shown in FIG. 16(*a*) (in the same direction as the first input member 33). The paper feed roller is thus rotated in the reverse direction through the driven gear 48. When the orbiting speed of the intermediate bevel gears 41 is further increased from the state of FIG. 16(*b*) until it becomes equal to the rotating speed of the first input member 33, the intermediate bevel gears 41 stop rotating about the shafts 38. When the orbiting speed of the intermediate bevel gears 41 is further increased, the intermediate bevel gears 41 begin to rotate about the shafts 38 in the direction opposite to its rotating direction shown in FIG. 16(*a*). In this state, the rotating direction of the output member 35 remains opposite to its rotating direction shown in FIG. 16(*a*) and its rotating speed increases with the orbiting speed of the intermediate bevel gears 41.

Thus, with this rotation transmission device, with the first input member 33 rotating, by changing the orbiting speed of the intermediate bevel gears 41 of the second input member 34 to below or above half the rotating speed of the first input member 33, it is possible to reverse the rotating direction of the output member 35.

In this embodiment, since no spring clutch is used to reverse the rotating direction of the output member 35, it is simpler in structure and can more stably reverse the rotating direction of the output member than conventional arrangements.

Figure 17:
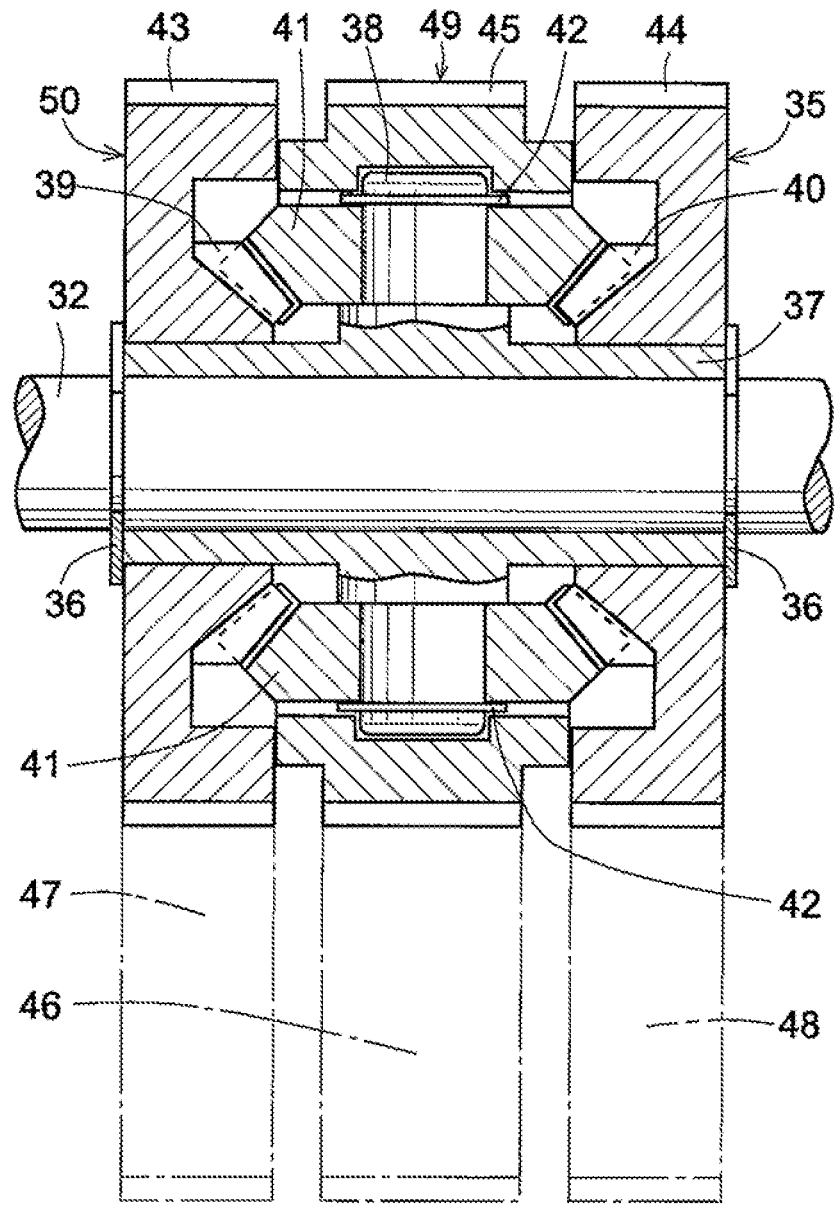
FIG. 17 is a sectional front view of an eighth embodiment. 7. and 16(c) show different operation the FIGS. 18(a) and 18(b) show different operational states of the rotation transmission device of FIG. 17.
Figure 18A:
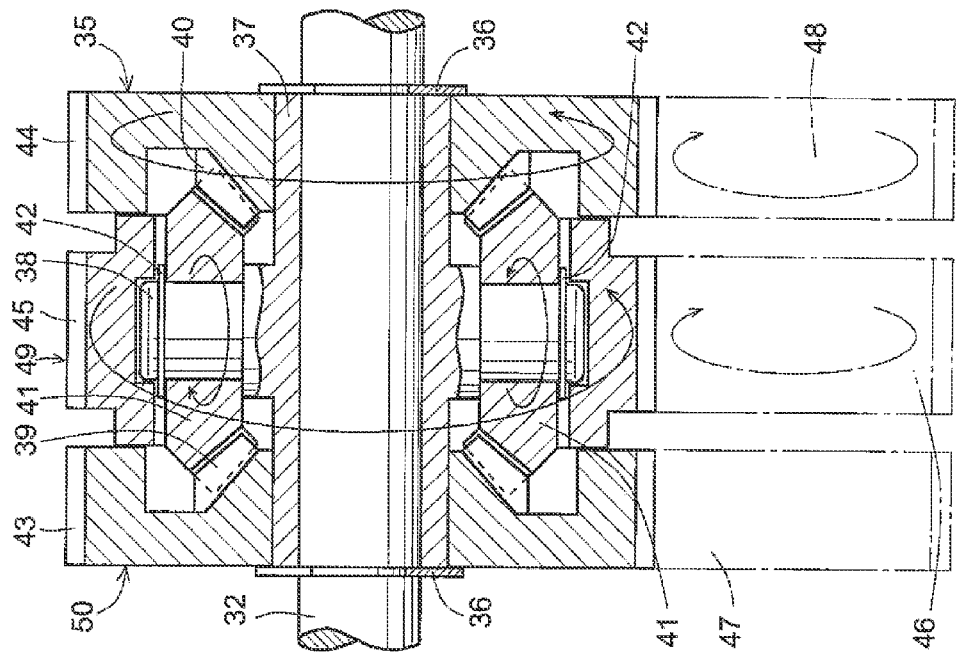

FIGS. 17, 18(*a*) and 18(*b*) show the eighth embodiment. This embodiment is structurally the same as the seventh embodiment, except that the second input member 34 of the seventh embodiment is used as the first input member 49, so that its ring gear 45 meshes with the first drive gear 46, and that the first input member 33 of the seventh embodiment is used as the second input member 50, so that its ring gear 43 meshes with the second drive gear 47.

Now the operation of this rotation transmission device is described. As shown in FIG. 18(*a*), when driving torque is applied to the first input member 49 through the first drive gear 46 (in the direction opposite to the direction in the seventh embodiment), while keeping the second input member 50 stationary, the rotation of the intermediate shafts 38 causes the intermediate bevel gears 41 to rotate about the intermediate shafts 38 and simultaneously revolve (orbit) around the fixed shaft 32. This in turn causes the output member 35 to rotate in the same direction as the first input member 49. A paper feed roller (not shown) is thus rotated in the normal direction through the driven gear 48.

In the state of FIG. 18(*a*), when driving torque is applied to the second input member 50 through the second drive gear 47 in the same direction as the driving torque applied to the first input member 49, the rotating speed and direction of the intermediate bevel gears 41 of the first input member 49 about the shafts 38 change according to the rotating speed of the second input member 50.

Figure 18B:
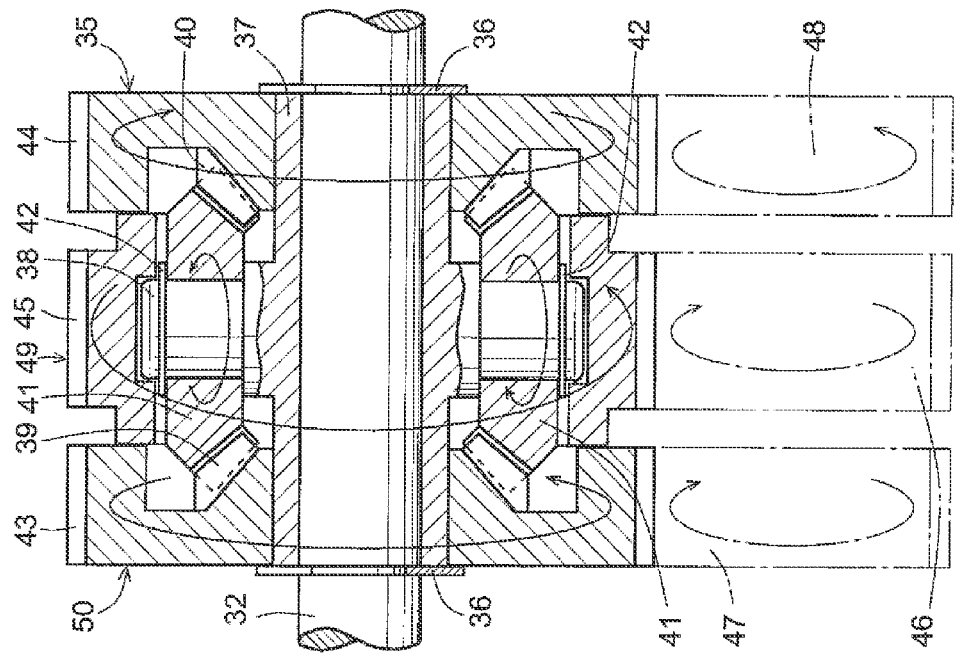

Specifically, while the rotating speed of the second input member 50 is lower than the orbiting speed of the intermediate bevel gears 41 of the first input member 49 (rotating speed of the intermediate shafts 38 about the fixed shaft 32), only the rotating speed of the intermediate bevel gears 41 about the shafts 38 changes. When the rotating speed of the second input member 50 becomes equal to the orbiting speed of the intermediate bevel gears 41, the intermediate bevel gears 41 stop rotating about the shafts 38. When the rotating speed of the second input member 50 exceeds the orbiting speed of the intermediate bevel gears 41, the intermediate bevel gears 41 begin to rotate about the shafts 38 in the direction opposite to its rotating direction shown in FIG. 18(*a*). During this period, the output member 35 keeps rotating in the same direction as shown in FIG. 18(*a*) with its rotating speed increasing. When the rotating speed of the second input member 50 further increases and becomes equal to twice the orbiting speed of the intermediate bevel gears 41, the orbiting speed of the intermediate bevel gears 41 becomes equal to their rotating speed about the shafts 38, so that the output member 35 stops. When the rotating speed of the second input member 50 exceeds twice the orbiting speed of the intermediate bevel gears 41, the rotating speed of the intermediate bevel gears 41 exceeds their orbiting speed, thus causing the output member 35 to rotate in the direction opposite to its rotating direction shown in FIG. 18(*a*) (in the same direction as the first input member 33), as shown in FIG. 18(b). The paper feed roller is thus rotated in the reverse direction through the driven gear 48.

Thus, with this rotation transmission device, with the intermediate bevel gears 41 of the first input member 49 orbiting around the fixed shaft 32, by changing the rotating speed of the second input member 50 to below or above twice the orbiting speed of the intermediate bevel gears 41, it is possible to reverse the rotating direction of the output member 35.

Thus, as with the seventh embodiment, the device of this embodiment is also simpler in structure and can more stably reverse the rotating direction of the output member than conventional arrangements, which use a spring clutch.

What is claimed is:

1. A rotation transmission device comprising:
    an input shaft having first and second opposite end portions;
    an output shaft arranged at the first end portion of the input shaft so as to be coaxial with the input shaft;
    opposed first and second bevel gears, said first bevel gear being rotationally fixed to the output shaft;
    an intermediate bevel gear meshing with the first and second bevel gears;
    a first one-way clutch operably coupled between the input shaft and the output shaft at the first end portion of the input shaft and configured such that rotation of the input shaft in the normal direction is transmitted to the output shaft or the first bevel gear through the first one-way clutch; and
    a second one-way clutch operably coupled between the input shaft and the second bevel gear at the second end portion of the input shaft and configured such that rotation of the input shaft in the reverse direction is transmitted to the second bevel gear through the second one-way clutch;
    wherein the first one-way clutch is operably coupled with the input shaft at a position such that the first end portion of the input shaft extends axially beyond the first one-way clutch in a direction away from the second end portion of the input shaft; and
    wherein the input shaft, the output shaft, the first and second bevel gears, the intermediate bevel gear, and the first and second one-way clutches are configured such that rotations of the input shaft in both a normal direction and a reverse direction are converted to rotation of the output shaft in one direction.

2. The rotation transmission device of claim 1, wherein the first and second one-way clutches are identical in structure to each other.

3. The rotation transmission device of claim 1, wherein the output shaft includes a small diameter tubular portion and a large diameter tubular portion that is larger in diameter than said small diameter tubular portion.

4. The rotation transmission device of claim 3, wherein the first end portion of the input shaft extends into the small diameter tubular portion of the output shaft.

5. The rotation transmission device of claim 4, wherein the first bevel gear is connected to the large diameter tubular portion of the output shaft.

6. The rotation transmission device of claim 5, wherein the first bevel gear has a tubular portion that is fitted in the large diameter tubular portion of the output shaft so that the output shaft is fixed for rotation with the first bevel gear.

7. The rotation transmission device of claim 6, wherein the first one-way clutch is disposed within the tubular portion of the first bevel gear.

8. The rotation transmission device of claim 3, wherein the first bevel gear is connected to the large diameter tubular portion of the output shaft.

9. The rotation transmission device of claim 8, wherein the first bevel gear has a tubular portion that is fitted in the large diameter tubular portion of the output shaft so that the output shaft is fixed for rotation with the first bevel gear.

10. The rotation transmission device of claim 9, wherein the first one-way clutch is disposed within the tubular portion of the first bevel gear.

\* \* \* \* \*